US008104007B2

(12) United States Patent
Kariat et al.

(10) Patent No.: US 8,104,007 B2
(45) Date of Patent: Jan. 24, 2012

(54) METHOD AND APPARATUS FOR THERMAL ANALYSIS

(75) Inventors: Vinod Kariat, Sunnyvale, CA (US); Eddy Pramono, Santa Clara, CA (US); Yong Zhan, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 362 days.

(21) Appl. No.: 12/144,651

(22) Filed: Jun. 24, 2008

(65) Prior Publication Data

US 2009/0319964 A1 Dec. 24, 2009

(51) Int. Cl.
*G06F 17/50* (2006.01)
(52) U.S. Cl. ........................................ 716/110
(58) Field of Classification Search ............... 716/1, 5, 716/100, 110
See application file for complete search history.

(56) References Cited

U.S. PATENT DOCUMENTS

| | | | |
|---|---|---|---|
| 6,842,714 B1 | 1/2005 | Acar et al. | |
| 6,895,354 B2 * | 5/2005 | Matsuyama et al. | 702/136 |
| 7,366,997 B1 * | 4/2008 | Rahmat et al. | 716/111 |
| 7,548,792 B2 * | 6/2009 | Kumano et al. | 700/98 |
| 7,626,144 B2 * | 12/2009 | Merzliakov | 219/483 |
| 2004/0073397 A1 * | 4/2004 | Matsuyama et al. | 702/136 |
| 2005/0044515 A1 | 2/2005 | Acar et al. | |
| 2005/0102117 A1 * | 5/2005 | Habitz | 702/133 |
| 2006/0039114 A1 * | 2/2006 | Hamann et al. | 361/704 |
| 2006/0095493 A1 * | 5/2006 | Kumano et al. | 708/490 |
| 2007/0168151 A1 | 7/2007 | Kernahan et al. | |
| 2007/0206654 A1 * | 9/2007 | Merzliakov | 374/31 |
| 2007/0244676 A1 | 10/2007 | Shang et al. | |
| 2008/0026493 A1 * | 1/2008 | Shakouri et al. | 438/17 |
| 2008/0072182 A1 | 3/2008 | He et al. | |
| 2008/0168406 A1 * | 7/2008 | Rahmat et al. | 716/2 |
| 2008/0183322 A1 | 7/2008 | Kumano et al. | |
| 2008/0244278 A1 | 10/2008 | Monferrer et al. | |
| 2009/0024969 A1 | 1/2009 | Chandra | |
| 2009/0199140 A1 * | 8/2009 | Kariat et al. | 716/5 |
| 2009/0319965 A1 * | 12/2009 | Kariat et al. | 716/4 |
| 2010/0023903 A1 * | 1/2010 | Pramono et al. | 716/5 |

OTHER PUBLICATIONS

Portions of prosecution history of U.S. Appl. No. 12/024,002, mailed Feb. 8, 2010, Vinod Kariat, et al.
Zienkiewicz, O.C., "The Finite Element Method" $3^{rd}$ ed., 1977, pp. 423-449, McGraw-Hill Book Company (UK) Limited, Berkshire, England.
Updated portions of prosecution history of U.S. Appl. No. 12/024,002, Dec. 9, 2010, Kariat, Vinod, et al.

(Continued)

*Primary Examiner* — Suchin Parihar
(74) *Attorney, Agent, or Firm* — Adeli & Tollen LLP

(57) ABSTRACT

Some embodiments of the invention provide a method for performing thermal analysis of an integrated circuit ("IC") design layout that includes numerous circuit modules. The method divides the IC design layout into a set of elements, where at least one element includes several wires. The method computes a set of conductivity groups of values for the set of elements. The method identifies a temperature distribution for the IC design layout based on the set of conductivity groups of values. In some embodiments, each of these elements corresponds to a particular portion of a particular layer of the IC design layout. Each element includes several nodes. Each conductivity group of values is defined by entry values. Each entry value describes how heat flow at a particular node of the element is affected by a temperature change at another particular node of the element.

27 Claims, 28 Drawing Sheets

OTHER PUBLICATIONS

Updated portions of prosecution history of U.S. Appl. No. 12/024,002, Sep. 9, 2010, Kariat, Vinod, et al.
Portions of prosecution history of U.S. Appl. No. 12/416,793, Jan. 5, 2011, Karait, Vinod, et al.
Updated portions of prosecution history of U.S. Appl. No. 12/024,002, May 9, 2011, Kariat, Vinod, et al.
Portions of prosecution history of U.S. Appl. No. 12/180,490, May 18, 2011, Pramono, Eddy, et al.
Updated portions of prosecution history of U.S. Appl. No. 12/416,793, May 5, 2011, Kariat, Vinod, et al.
Goplen, Brent, et al., "Thermal Via Placement in 3D ICs", Proceedings of the 2005 International Symposium on Physical Design (ISPD'05), Apr. 3-6, 2005, pp. 167-174, ACM, San Francisco, CA, USA.
Final Office Action of U.S. Appl. No. 12/024,002, May 12, 2010, Vinod Kariat, et al.

* cited by examiner

Several Element Models

Residual metal area (A)
< 0.5 area rectangle on right (A+B)

Residual metal area (A)
= 0.5 area rectangle on right (A+B)

Residual metal area (A)
> 0.5 area rectangle on right (A+B)

$k_d$ = Thermal conductivity of dielectric $k_w$ = Thermal conductivity of wire $W2_{ij} = f(k_w-k_d, a, b, c, x_1, y_1, z_1, x_2, y_2, z_2)$ $C_{11} = C_{11} + W2_{11}$   $C_{21} = C_{21} + W2_{21}$
$C_{12} = C_{12} + W2_{12}$   $C_{22} = C_{22} + W2_{22}$
$C_{13} = C_{13} + W2_{13}$   $C_{23} = C_{23} + W2_{23}$
$C_{14} = C_{14} + W2_{14}$   $C_{24} = C_{24} + W2_{24}$ $C_{31} = C_{31} + W2_{31}$   $C_{41} = C_{41} + W2_{41}$
$C_{32} = C_{32} + W2_{32}$   $C_{42} = C_{42} + W2_{42}$
$C_{33} = C_{33} + W2_{33}$   $C_{43} = C_{43} + W2_{43}$
$C_{34} = C_{34} + W2_{34}$   $C_{44} = C_{44} + W2_{44}$

METHOD AND APPARATUS FOR THERMAL ANALYSIS

FIELD OF THE INVENTION

Some embodiments of the invention provide a method for performing thermal analysis that takes into account wiring in an integrated circuit design layout.

BACKGROUND OF THE INVENTION

An integrated circuit ("IC") is a device (e.g., semiconductor device) that includes many electronic components, such as transistors, resistors, diodes, etc. These electronic components can be connected together to form multiple circuit components such as gates, cells, memory units, arithmetic units, controllers, decoders, etc. An IC includes multiple layers of wiring that interconnect its electronic and circuit components.

Design engineers design IC's by transforming logical or circuit descriptions of the IC's components into geometric descriptions, called layouts. IC layouts typically include (1) circuit modules (i.e., geometric representations of electronic or circuit IC components) with pins, and (2) interconnect lines (i.e., geometric representations of wiring) that connect the pins of the circuit modules. A collection of pins that need to be connected is typically called a net.

To create layouts, design engineers often use electronic design automation ("EDA") applications. These applications provide sets of computer-based tools for creating, editing, and analyzing IC design layouts. Examples of such tools include (1) standard cell libraries that provide numerous cells that can be instantiated as circuit modules in a design, (2) placement tools that define the location of the various circuit modules in a layout, (3) routing tools that define the wiring between the circuit modules, and (4) verification tools that verify that the designed layout will meet design operation requirements.

Thermal analysis tools are one type of verification tools that are used currently. Prior thermal analysis tools dealt mostly with the thermal analysis properties of the chip packages and often ignored thermal properties on the chip. These prior tools were mainly concerned about the total power dissipation of the chip, and about whether a specific package was sufficient to cool a given chip. In these tools, the chip often was treated as a lumped heat source, while the model for the package was very detailed, including details regarding airflow around the package.

In recent years, on-chip thermal analysis has become more important as the number of active devices and the total amount of on-chip power has increased due to larger chip sizes and/or smaller device sizes. This analysis has also become more important with the increase of the power density on the chips due to scaling. The increase in low power chips for mobile devices has also increased the demand for on-chip analysis. In low power chips, leakage current is a big contributor to power consumption. Often the techniques that are used in low power consuming chips (e.g., turning off areas of the IC) create voltage gradients, which cause leakage current and inaccurate power dissipation analysis.

As illustrated in FIG. 1, leakage current is greatly affected by on-chip temperature variations. In fact, a circular dependency exists between the on-chip temperature, leakage current, and power dissipation. As illustrated in FIG. 2, the leakage current 210 affects the power dissipation 215. As the leakage current 210 rises, the power dissipation 215 also rises along with it. The power dissipation 215 increases the temperature 205, which in turn increases the leakage current. This circular set of dependencies creates the potential for a runaway feedback loop in which the temperature of the IC continually increases with the leakage current.

FIG. 3 illustrates one current approach for performing on-chip thermal analysis for an IC design. Under this approach, a power analysis tool 305 and a thermal analysis tool 315 interact multiple times and repeatedly perform power and thermal analyses until their results begin to converge. Specifically, the power analysis tool 305 initially performs a first power analysis on a particular IC design that is defined by numerous parameters stored in a design database 310. To perform its initial analysis, the power analysis tool 305 assumes some ambient temperature for all circuit modules in the design. The power analysis tool 305 then passes to the thermal analysis tool 315 its initial results, which includes the power dissipated by each circuit module in the design.

The thermal analysis tool 315 then performs a first pass of its thermal analysis by converting the power dissipated by each circuit module into a heat source. This thermal analysis produces an intermediate temperature map 320 for the chip. This thermal map models the temperature distribution through the entire chip. In addition, an average temperature for each instance is available. The temperature for each circuit module is now passed back to power analysis tool 305. The power analysis tool 305 will now recompute the power dissipation of each circuit module based on the new temperatures; in particular, it will compute the leakage power of each circuit module. The new power numbers will now be passed on to the thermal analysis tool 315, which will now recompute a new temperature. After a certain number of iterations, the temperature and leakage will converge, and the iterations will stop at that point. The result of these iterative operations is a final thermal map 325 and a final power report 330.

The main disadvantage of the approach illustrated in FIG. 3 is that the iterations between power analysis and thermal analysis are slow and costly. In addition to the additional run time requirement, the system is also quite complex because of the loose iterations between different components in the system. Accordingly, there is a need for a method that more efficiently performs thermal analysis of an IC design. Moreover, there is a need for a method that performs thermal analysis of an IC design, where the wiring of the IC design layout is more efficiently taken into account.

SUMMARY OF THE INVENTION

Some embodiments of the invention provide a method for performing thermal analysis of an integrated circuit ("IC") design layout that includes numerous circuit modules. The method divides the IC design layout into a set of elements, where at least one element includes several wires. The method computes a set of conductivity groups of values for the set of elements. The method identifies a temperature distribution for the IC design layout based on the set of conductivity groups of values.

In some embodiments, each of these elements corresponds to a particular portion of a particular layer of the IC design layout. Each element includes several nodes. Each conductivity group of values is defined by entry values. Each entry value describes how heat flow at a particular node of the element is affected by a temperature change at another particular node of the element.

Different embodiments compute the set of conductivity groups of values differently. Some embodiments compute an effective thermal conductivity value that approximates a thermal conductivity value of a particular element of the IC design layout. In such instances, the effective thermal conductivity values are used to compute the set of conductivity groups of values. Some embodiments compute the effective thermal conductivity value by using an element model that is a representation of a composition of a particular element of the IC design layout to compute the effective thermal conductivity of the particular element. In some embodiments, the effective thermal conductivity value of the particular element is based on (i) a thermal conductivity value for a dielectric of the particular element, (ii) a total width of a set of wires in the particular element and (iii) a residual region for the particular element. However, the effective thermal conductivity value may be based on different attributes of the particular element.

Other embodiments compute the set of conductivity groups of values by using at least one parameterized function to directly compute entry values for the set of conductivity groups of values. In such instances, the set of conductivity groups of values is based on (i) a first set of entry values based on a dielectric component of the IC design layout and (ii) a second set of entry values based on at least one wire in the IC design layout. In some embodiments, the method computes the set of conductivity groups of values by computing for each particular element, a first set of entry values based on a dielectric component of the IC design layout. The method also identifies a wire in the IC design layout and computes for each particular element that includes the wire, a set of entry values based on the wire. The method adds for each particular element that includes the wire, the set of entry values to the first set of entry values to define a particular set of entry values that defines a particular conductivity group of values.

In addition, some embodiments identify the temperature distribution for the IC design layout based on the set of conductivity groups of values by solving a heat flow equation based on a set of power equations and the set of conductivity groups of values to identify the temperature distribution for the IC design layout. In some embodiments, the set of power equations express the temperature dependence of the power dissipation for several circuit modules. In some embodiments, the power dissipation equations express a non-linear relationship between power dissipation and temperature.

Different embodiments define the power dissipation equations differently. In some embodiments, the power dissipation equation for a circuit module has two components, one that is temperature dependent and one that is not. For instance, in some of these embodiments, the temperature-dependent component of the power dissipation includes the leakage power consumption of the circuit module, while the temperature-independent component includes the switching power of the circuit module.

In some of these embodiments, the leakage power of a circuit module is expressed in terms of a non-linear equation with respect to temperature. Some of these embodiments compute coefficients for the non-linear equation of a circuit module from the leakage power dissipation of the circuit module at two different temperatures. Other embodiments receive such coefficients from a third party (e.g., the manufacturer for the IC design, the developer of a library that contains the macro for the circuit module, etc.).

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
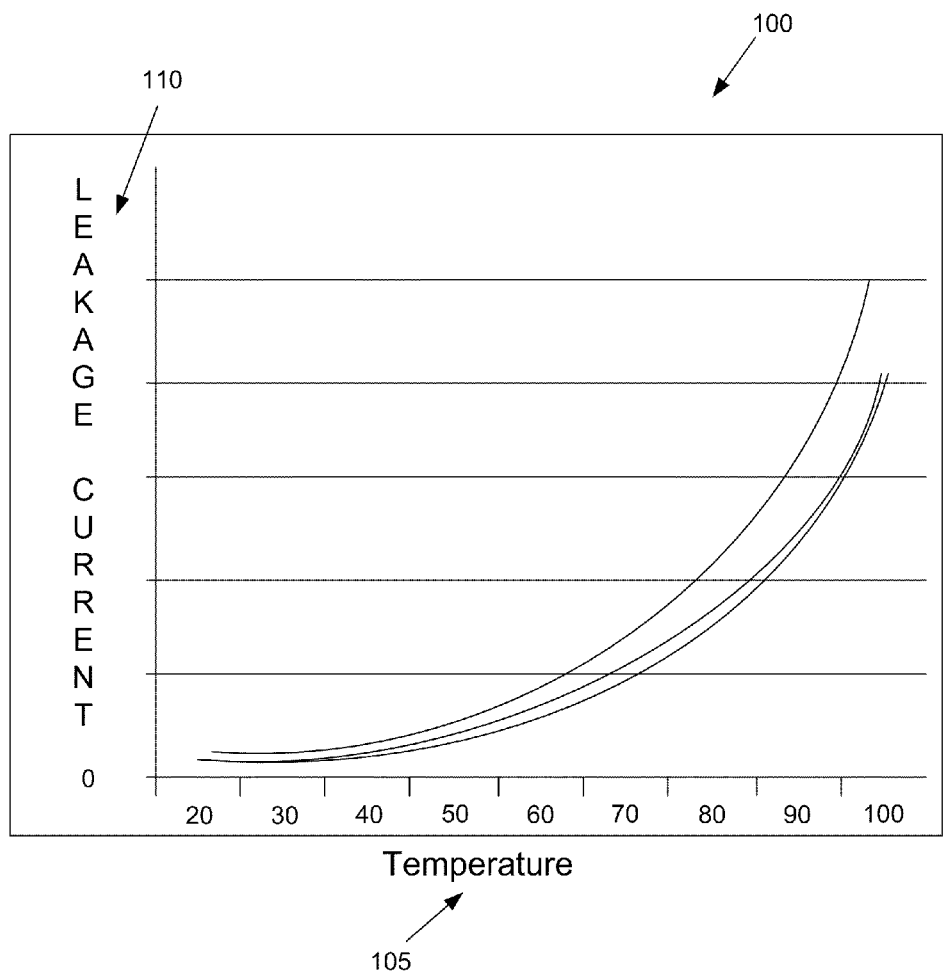
FIG. 1 illustrates that leakage current is greatly affected by on-chip temperature variations.
Figure 2:
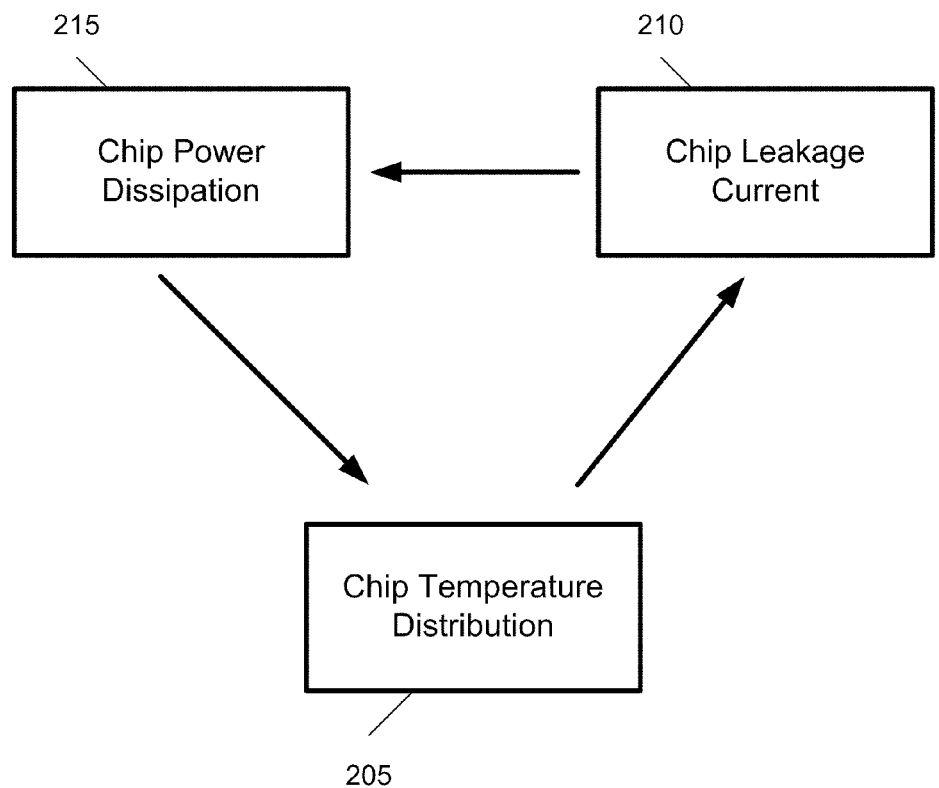
FIG. 2 illustrates that the leakage current affects the power dissipation.
Figure 3:
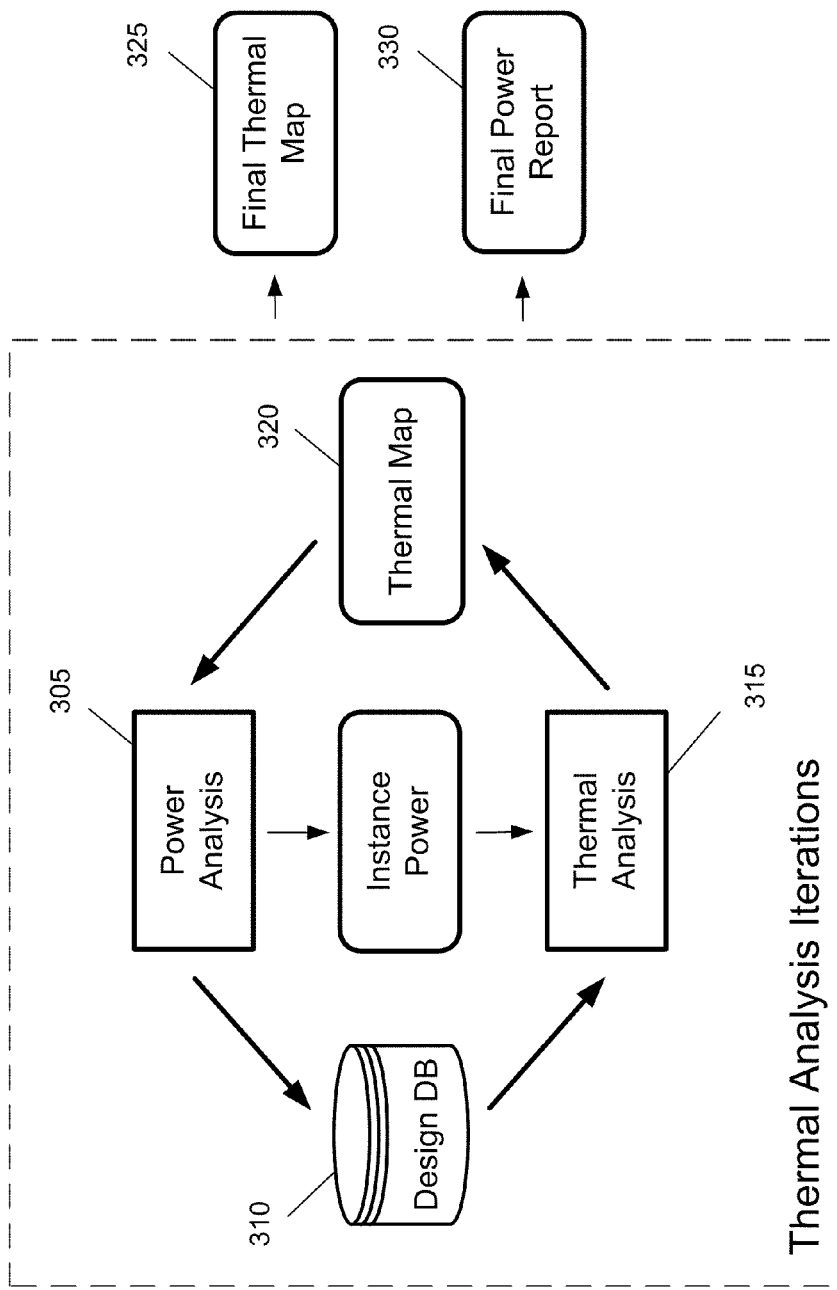
FIG. 3 illustrates one current approach for performing on-chip thermal analysis for an IC design.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Overview

Some embodiments of the invention provide a method for performing thermal analysis of an integrated circuit ("IC") design layout that includes numerous circuit modules. The method divides the IC design layout into a set of elements, where at least one element includes several wires. The method computes a set of conductivity groups of values for the set of elements. The method identifies a temperature distribution for the IC design layout based on the set of conductivity groups of values.

In some embodiments, each of these elements corresponds to a particular portion of a particular layer of the IC design layout. Each element includes several nodes. Each conductivity group of values is defined by entry values. Each entry value describes how heat flow at a particular node of the element is affected by a temperature change at another particular node of the element.

Different embodiments compute the set of conductivity groups of values differently. Some embodiments compute an effective thermal conductivity value that approximates a thermal conductivity value of a particular element of the IC design layout. In such instances, the effective thermal conductivity values are used to compute the set of conductivity groups of values. Some embodiments compute the effective thermal conductivity value by using an element model that is a representation of a composition of a particular element of the IC design layout to compute the effective thermal conductivity of the particular element. In some embodiments, the effective thermal conductivity value of the particular element is based on (i) a thermal conductivity value for a dielectric of the particular element, (ii) a total width of a set of wires in the particular element and (iii) a residual region for the particular element. However, the effective thermal conductivity value may be based on different attributes of the particular element.

Other embodiments compute the set of conductivity groups of values by using at least one parameterized function to directly compute entry values for the set of conductivity groups of values. In such instances, the set of conductivity groups of values is based on (i) a first set of entry values based on a dielectric component of the IC design layout and (ii) a second set of entry values based on at least one wire in the IC design layout. In some embodiments, the method computes the set of conductivity groups of values by computing for each particular element, a first set of entry values based on a dielectric component of the IC design layout. The method also identifies a wire in the IC design layout and computes for each particular element that includes the wire, a set of entry values based on the wire. The method adds for each particular element that includes the wire, the set of entry values to the first set of entry values to define a particular set of entry values that defines a particular conductivity group of values.

In addition, some embodiments identify the temperature distribution for the IC design layout based on the set of conductivity groups of values by solving a heat flow equation based on a set of power equations and the set of conductivity groups of values to identify the temperature distribution for the IC design layout. In some embodiments, the set of power equations express the temperature dependence of the power dissipation for several circuit modules. In some embodiments, the power dissipation equations express a non-linear relationship between power dissipation and temperature.

Different embodiments define the power dissipation equations differently. In some embodiments, the power dissipation equation for a circuit module has two components, one that is temperature dependent and one that is not. For instance, in some of these embodiments, the temperature-dependent component of the power dissipation includes the leakage power consumption of the circuit module, while the temperature-independent component includes the switching power of the circuit module.

In some of these embodiments, the leakage power of a circuit module is expressed in terms of a non-linear equation with respect to temperature. Some of these embodiments compute coefficients for the non-linear equation of a circuit module from the leakage power dissipation of the circuit module at two different temperatures. Other embodiments receive such coefficients from a third party (e.g., the manufacturer for the IC design, the developer of a library that contains the macro for the circuit module, etc.).

Some examples of performing thermal analysis are described in U.S. application Ser. No. 12/024,002, filed Jan. 31, 2008, entitled "Method and Apparatus for Thermal Analysis", now published as U.S. Patent Application Publication 2009/0199140. U.S. Patent Application Publication 2009/0199140 is hereinafter incorporated by reference. Several more detailed embodiments will now be described.

II. Overall Flow

Figure 4:
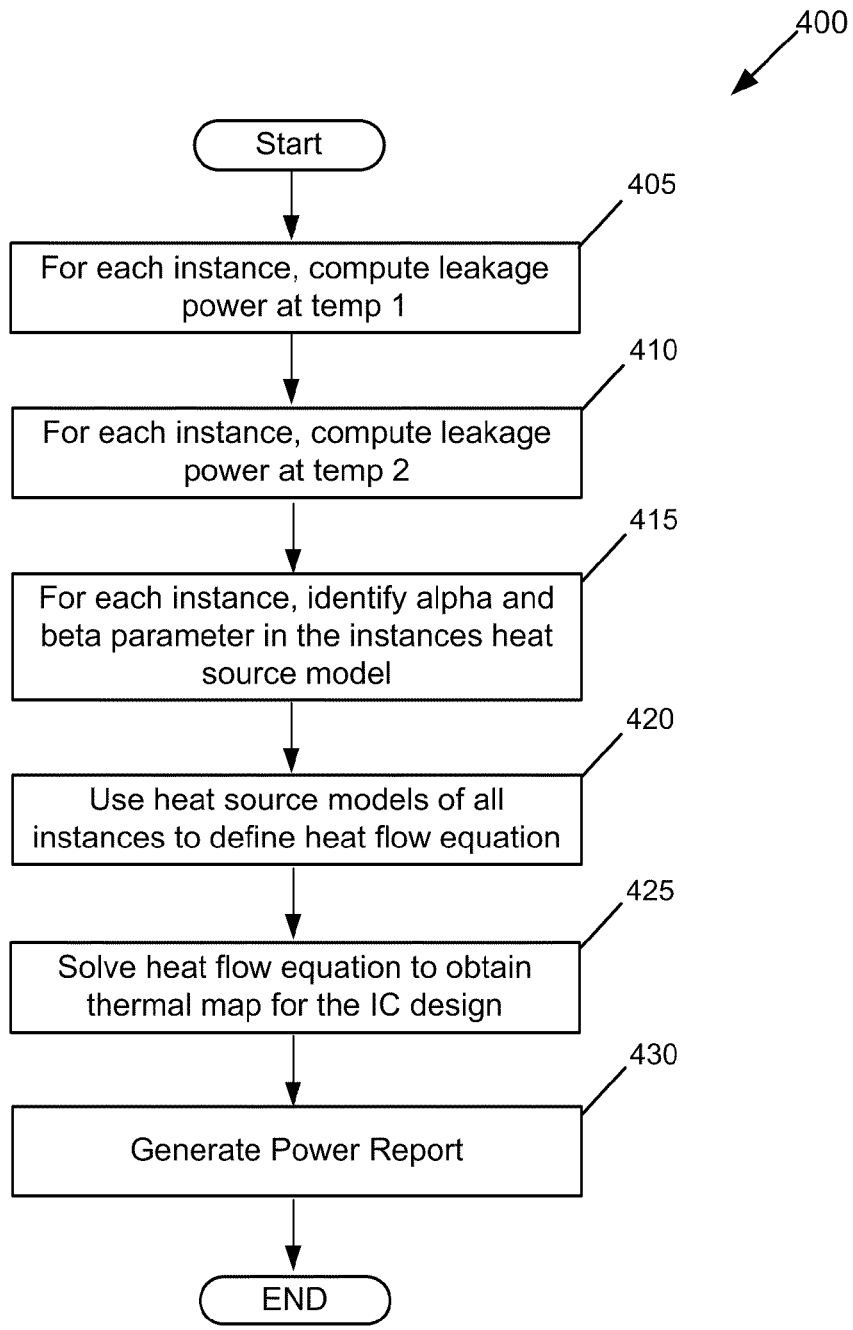
FIG. 4 conceptually illustrates a process that represents the overall flow of some embodiments of the invention.

FIG. 4 conceptually illustrates a process 400 that represents the overall flow of some embodiments of the invention. This process generates a thermal map and a power analysis report for the IC design without iterating multiple times between the power and thermal analysis. In some embodiments, this process is performed by one EDA tool (e.g., a thermal analysis tool), while in other embodiments, several different tools (e.g., two different tools) perform this process.

The process 400 starts when it receives a design layout on which it has to perform thermal analysis. As shown in FIG. 4, the process 400 initially computes (at 405 and 410) the leakage power of each circuit module in the IC design at two different temperatures, $T_1$ and $T_2$. In some embodiments, the two temperatures $T_1$ and $T_2$ bound the temperature domain of interest. In other embodiments, the two temperatures are two temperatures that fall within the temperature domain of interest.

In some embodiments, many or all of the circuit modules in the IC design are cells (i.e., small circuits) that come from one or more libraries that were used to design the layout that the process 400 receives. In these embodiments, the process computes the leakage power for each cell at the two different temperatures. In other words, the process does not need to compute the two leakage power values for each instance of a particular cell that is used in the design. Instead, it only needs to compute these values for each particular cell. In this manner, the operations of the process at 405 and 410 can be viewed in some embodiments as generating two different cell leakage-power libraries, where each library is characterized at a different temperature.

If a transistor level description of the cell library is available, this description can be used to compute the power at two temperatures by using circuit simulation. Many circuit simulation programs exist that can perform such computation. Spice simulation programs are one example of such programs.

For each transistor, spice simulation programs often have a spice model and a temperature parameter that describes how the transistor will behave at a particular temperature. By using such models, spice simulation programs can compute leakage power at two different temperatures. For instance, to compute the leakage power at a particular temperature for a particular CMOS inverter with its input state at a logic 0, a spice program would (1) set the input of the inverter to zero volts for a transient period (e.g., a few milliseconds), (2) use the temperature parameters of the CMOS inverter's transistors to compute the average current flow through the inverter at the particular parameter, and (3) multiply the average current flow by the voltage supplied to the inverter, which would typically be $V_{dd}$.

After computing the instance leakage power dissipation of each particular circuit module (e.g., each cell), the process then computes (at 415) the parameters of a non-linear equation that represents the leakage power dissipation of the particular circuit module. Some embodiments use the following exponential equation to represent the leakage power dissipation of a circuit module.

$$LP = \alpha e^{\beta T} \quad (1)$$

In the above equation, LP represents the leakage power, T represents the temperature, and $\alpha$ and $\beta$ are constants. Taking the natural logarithm of both sides of this equation yields the result that the logarithm of leakage power is a linear function of temperature, as illustrated by the following equation:

$$\ln(LP) = \ln(\alpha) + \beta T \quad (2)$$

Therefore, for each circuit module (e.g., each cell), the $\alpha$ and $\beta$ coefficients for that module's heat source model can be derived from the leakage power for the module at two temperatures. Specifically, for a particular circuit module (e.g., cell), a first leakage power $LP_1$ at a first temperature $T_1$ and a second leakage power $LP_2$ at a second temperature $T_2$ provides the following two equations:

$$\ln(LP_1) = \ln(\alpha) + \beta T_1, \text{ and} \quad (3)$$

$$\ln(LP_2) = \ln(\alpha) + \beta T_2, \quad (4)$$

which can be solved to provide the two coefficients $\alpha$ and $\beta$ for the particular circuit module.

Once the two coefficients $\alpha$ and $\beta$ are computed for each circuit module, the process specifies (at 420) a heat flow equation to express the on-chip temperature in terms of the chip's power consumption. This power consumption includes the leakage power consumption of the circuit modules. In some embodiments, the heat flow equation expresses the temperature-dependent, leakage power consumption of each circuit module by using Equation (1) with the coefficients $\alpha$ and $\beta$, which were computed at 415. Section III describes the heat flow equation of some embodiments of the invention.

After defining the heat flow equation (at 420), the process solves (at 425) the heat flow equation to obtain a two-dimensional thermal map for the IC design. In some embodiments, the process solves this equation iteratively until it determines that its solutions have started to converge to be within an acceptable threshold. Section V describes this iterative solving process.

Figure 5:
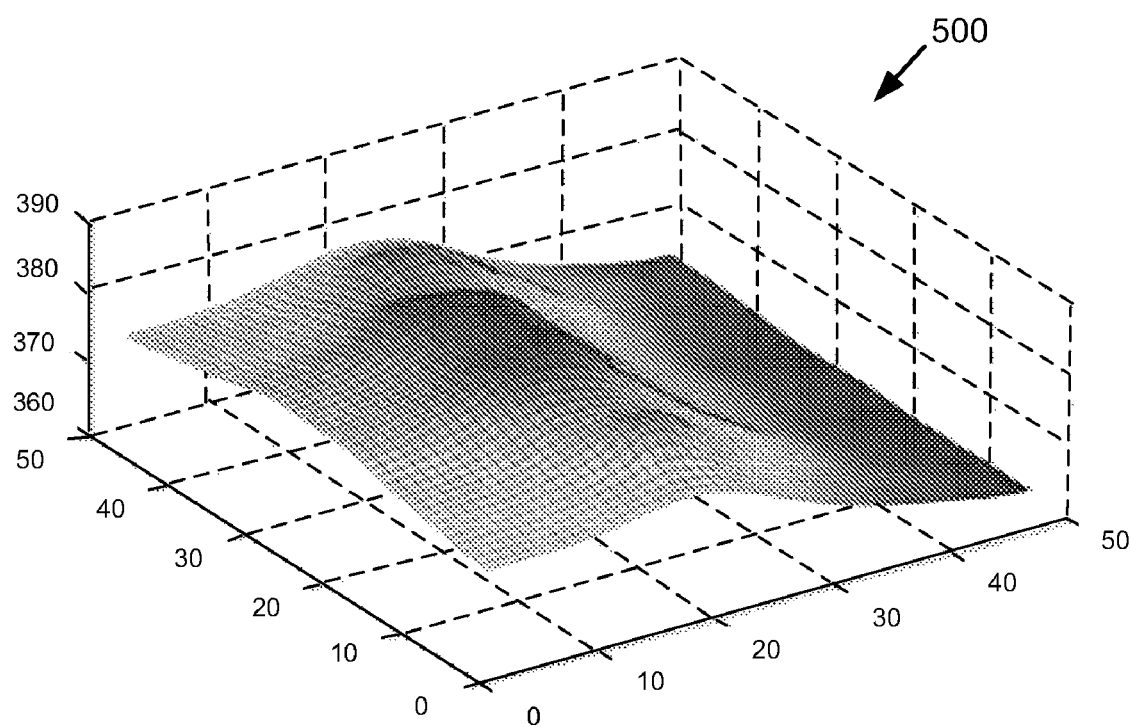
FIG. 5 illustrates a two-dimensional temperature map for one of the layers of an IC.

The solution that is obtained (at 425) for the heat flow equation is a three-dimensional thermal map of the IC. FIG. 5 illustrates a two-dimensional temperature map 500 for one of the layers of the IC. This map plots temperature (along the z-axis) in Kelvin as a function of spatial x and y coordinates on a particular layer of the IC. In some embodiments, this map is color coded to show the different temperatures in different colors, in order to allow visual identification of hot spots on the chip. This map will not only show the temperature at various locations on the IC, but also temperature gradients as well.

After obtaining this map, the process 400 can generate (at 430) a power consumption report for the IC design. This power consumption report provides the overall power consumption of the IC design as well as the power consumption of each circuit module in the IC design. After 430, the process ends.

III. Heat Flow Equation

The heat flow equation in some embodiments is expressed as $$C * T = P(T) \quad (5)$$

In this equation, C is a conductivity group of values (e.g., conductivity matrix) that expresses the estimated conductivity of different nodes in the design, T is a temperature vector that expresses the estimated temperature of different nodes in the design, and P(T) is a vector that is related to the estimated power consumption of different nodes in the design. The concept of nodes is further described below.

Different embodiments express the conductivity group of values C and power-related vector P(T) of Equation (5) differently. Below is one finite-element formulation for the problem. Other embodiments might formulate C and P(T) differently for the heat flow Equation (5). Yet other embodiments might use different heat flow equations than Equation (5).

Figure 6:
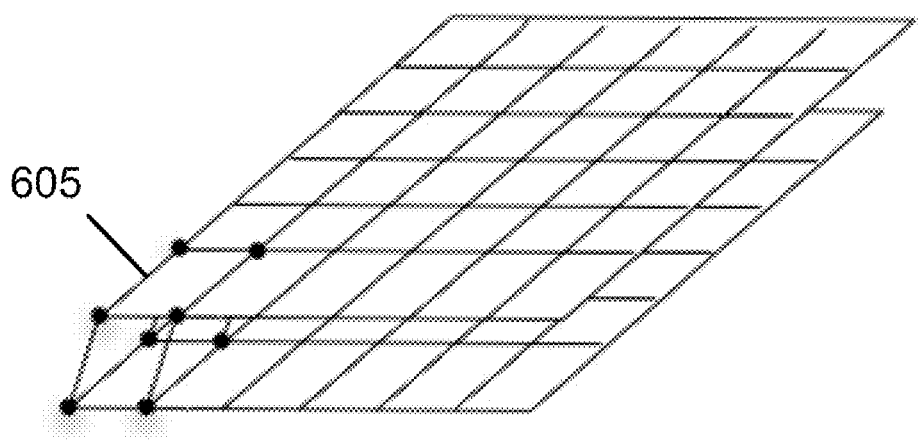
FIG. 6 illustrates a design layout that has been divided in several bricks.

To derive a more manageable finite-element formulation of the heat flow equation, some embodiments divide the IC design into several elements 605 of FIG. 6. In some embodiments, each of these elements corresponds to a particular portion of a particular layer of an IC design layout. However, different embodiments may associate an element to an IC design layout differently. As shown in FIG. 6, each element (e.g., brick) has eight vertices. These vertices are the nodes for which some embodiments express the conductivity group of values C, compute the power-related vector P(T), and calculate the temperature vector T.

These embodiments then express the finite element formulation of the heat flow Equation (5) by specifying the conductivity group of values C as:

$$C_{ij} = \int_\Omega \nabla^T N_i k \nabla N_j \, d\Omega + \int_{\Gamma_q} N_i h N_j \, d\Gamma_q \quad (6)$$

and the power-related vector P(T) as:

$$P_i(T) = \int_\Omega N_i g(x, y, z, T) \, d\Omega + \int_{\Gamma_q} N_i f \, d\Gamma_q. \quad (7)$$

Figure 7:
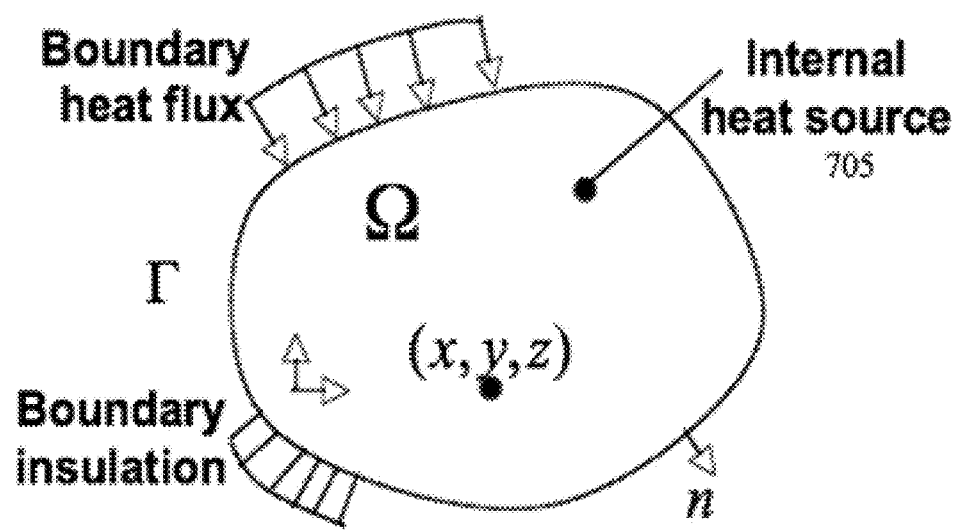
FIG. 7 illustrates a conceptual diagram of a heat source within a domain.

In these equations,
  $\Omega$ is the multi-layer IC design volume where the temperature distribution is to be computed,
  $\Gamma_q$ is the boundary where the boundary condition is applied, as illustrated in FIG. 7,
  i and j are nodes in the volume,
  $N_i$ is the shape function associated with node i,
  x, y, and z are point coordinates in the region,
  T is temperature,
  g(x,y,z,T) is the steady state power density of a heat source 705 as the point heat source illustrated in FIG. 7,
  k(x,y,z,T) is the thermal conductivity,
  h is the heat transfer coefficient on the boundary through a specified package model to the ambient environment, and
  f is $h*T_a$, where $T_a$ is the ambient temperature.

The steady-state power density term g(x,y,z,T) can be written as:

$$g(x,y,z,T) = g_i(x,y,z,T) + g_s(x,y,z,T) + g_l(x,y,z,T) \quad (8)$$

where $g_i(x,y,z,T)$ is the steady-state internal power density, $g_s(x,y,z,T)$ is the steady-state switching power density, and $g_l(x,y,z,T)$ is the steady-state leakage power density. Of these three power consumption components, $g_i$, $g_s$, and $g_l$, some embodiments only treat the leakage power consumption $g_l$ as temperature dependent. Other embodiments might also treat the switching power consumption and/or internal power consumption as temperature dependent.

The derivation of the temperature-dependent leakage power for a circuit module was described above. To compute the leakage power of a circuit module, the circuit module needs to have an associated temperature. The temperature of the circuit module is interpolated from the temperature of its neighboring nodes (e.g., as a weighted average based on the distance from the nodes of the element that wholly includes the circuit module, or from the nodes of the two or more elements that includes the circuit module).

The finite element equations (6)-(8) that were shown above are derived by discretizing the steady state heat flow equation:

$$\nabla \cdot [k(x, y, z, T) \nabla T(x, y, z)] = -g(x, y, z, T)$$

under the boundary condition $$k(x, y, z, T)\frac{\partial T(x, y, z)}{\partial n_i} + hT(x, t, z) = f(x, y, z),$$

where this steady state heat flow equation is a specific case of the more general heat flow equation $$\rho(x, y, z, T)C_p(x, y, z, T)\frac{\partial T(x, y, z, t)}{\partial t} =$$
$$\nabla \cdot [k(x, y, z, t)\nabla T(x, y, z, t)] + g(x, y, z, T, t).$$

In these equations, again, x, y, and z are point coordinates in the region, t is time, $T(x,y,z,t)$ is instantaneous temperature at any point, $g(x,y,z,T,t)$ is the power density of a heat source 705 at a point, $k(x,y,z,T)$ is the thermal conductivity, $\rho(x,y,z,T)$ is the material density, $C_P(x,y,z,T)$ is the specific heat, h is the heat transfer coefficient on the boundary, and n is the outward direction of the boundary surface.

In some embodiments, the above equations and formulations are implemented by taking into account the wiring of the IC design layout. In other words, in some embodiments, these equations look at the dielectric component and the wiring component of the IC design layout. Section IV below further describes different implementations of the above equations and computations to take into account wiring in the IC design layout.

IV. Taking Into Account Wiring in an IC Design Layout

In some embodiments, the wiring of an IC design layout effectively changes the thermal conductivity of the IC design layout. Thus, the thermal analysis of the IC design layout must take into account wiring component of the IC design layout. Different embodiments may account for the wiring component differently. Some embodiments may use a crude approximation of the wiring component of the IC design layout. Additionally, some embodiments may use a very detailed analysis of the wiring component of the IC design layout. In addition, some embodiments may use a balanced approach between using the crude approximation and the detailed analysis of the wiring component in the IC design layout. Some of these different implementations are further described below.

As mentioned above, some embodiments of the invention use the heat flow equations (6) and (7) to compute groups of values that account for the dielectric component and wiring component of the IC design layout. These groups of values are based on how the design layout is divided, in some embodiments. Different embodiments divide the IC design layout differently. Some embodiments divide the IC design layout such that a particular element comprises a particular portion of a particular layer of the IC design layout (e.g., half of a portion of a particular layer). In some embodiments, the IC design layout is divided into several of uniform elements. Each element can include a dielectric component, a wiring component, or different combinations of dielectric and wiring components. For example, an element can include more than one wire in some instances. Once the IC design layout is divided into several elements, the groups of values for the above heat flow equations can be computed, in some embodiments. Different embodiments may compute these groups of values differently.

In some embodiments of the invention, a conductivity group of values that accounts for wiring is computed based on a set of equivalent thermal conductivity values ($k_{equivalent}$), which is further described below. In some embodiments, the conductivity group of values is an element group of values (e.g., element matrix) for a particular element (e.g., element 605) of the IC design layout. In some embodiments, the element group of values is first computed for the dielectric component of the IC design layout and then the element group of values is updated/adjusted to account for the wiring component of the IC design layout. However, before describing a method for computing an element group of values, a method for computing an equivalent thermal conductivity value will first be described below.

A. Computing an Equivalent Thermal Conductivity Value (k)

As indicated above, the element group of values for an IC design layout is derived by using Equation (6). This particular equation is based on a particular thermal conductivity value. In some embodiments, this particular thermal conductivity value is the thermal conductivity value of a dielectric for the IC design layout. In other embodiments, a different thermal conductivity value may be used for performing a thermal analysis of the IC design layout.

For example, some embodiments of the invention use a set of equivalent thermal conductivity values in Equation (6). In some embodiments, an equivalent thermal conductivity value is used to account for the effect wiring in heat transfer in the IC design layout. This equivalent thermal conductivity value is based on the notion that a particular non-homogeneous element (e.g., element with more than one different component, each component having different thermal conductivity values) has an equivalent homogeneous element with an equivalent thermal conductivity value. In some embodiments, the equivalent thermal conductivity value is an effective thermal conductivity value.

Figure 8:
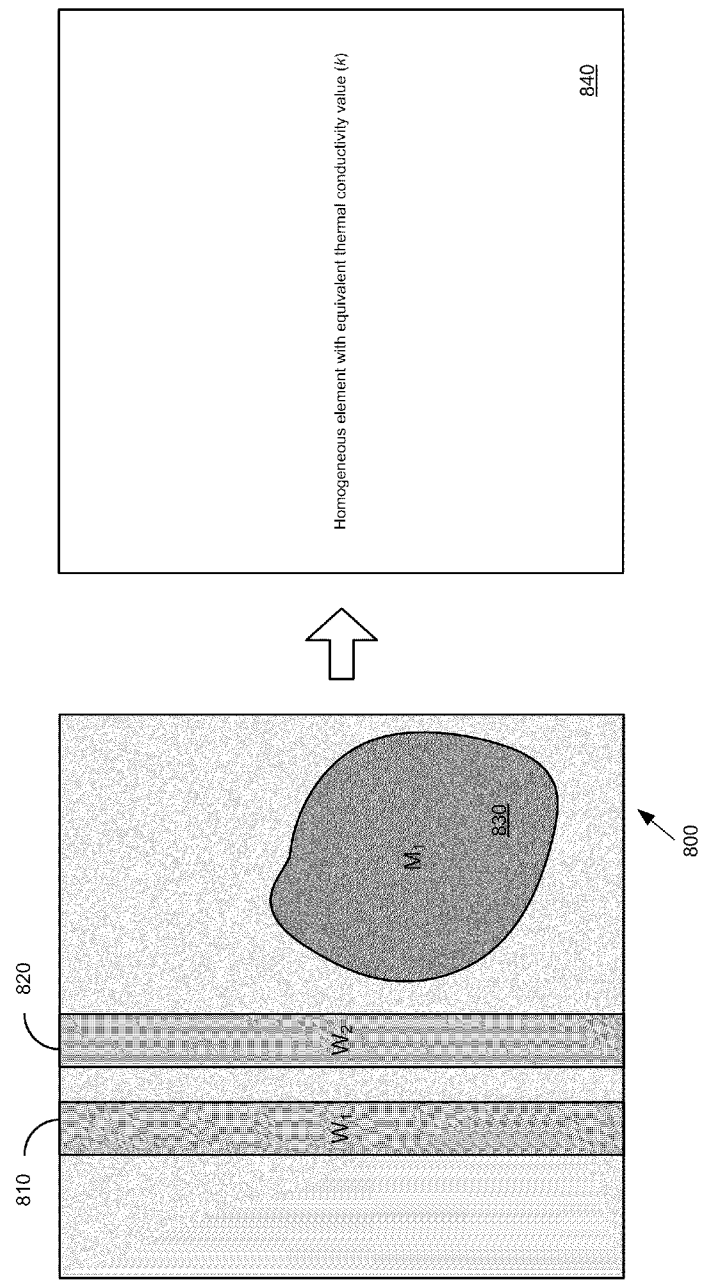
FIG. 8 illustrates the concept of an equivalent homogeneous element.

FIG. 8 conceptually illustrates this notion of an equivalent element. As shown in this figure, non-homogeneous element 800 includes two wires 810-820 and a residual area 830. The wires 810-820 and residual area 830 are made up of a particular material that is different than the dielectric of the non-homogeneous element 800. This particular material has a thermal conductivity value that is different than a thermal conductivity value of the dielectric. In some embodiments, the non-homogeneous element 800 may have a thermal conductivity value that is somewhere in between the thermal conductivity value of the particular material and thermal conductivity of the dielectric. This non-homogeneous element 800 can be represented by a homogeneous element 840 that includes a material with an equivalent thermal conductivity value. A method for computing an equivalent thermal conductivity value is described below in Section ii.

i. Element Model

In some embodiments, the computation of an equivalent thermal conductivity value may be difficult because the non-homogeneous element is complicated. Accordingly, in some embodiments, a particular element model may be used to represent the non-homogenous element. This particular element model may be an approximation of the non-homogeneous element, in some embodiments. In other words, in some embodiments, the particular element model may be a simplification of the non-homogeneous element.

Figure 9:
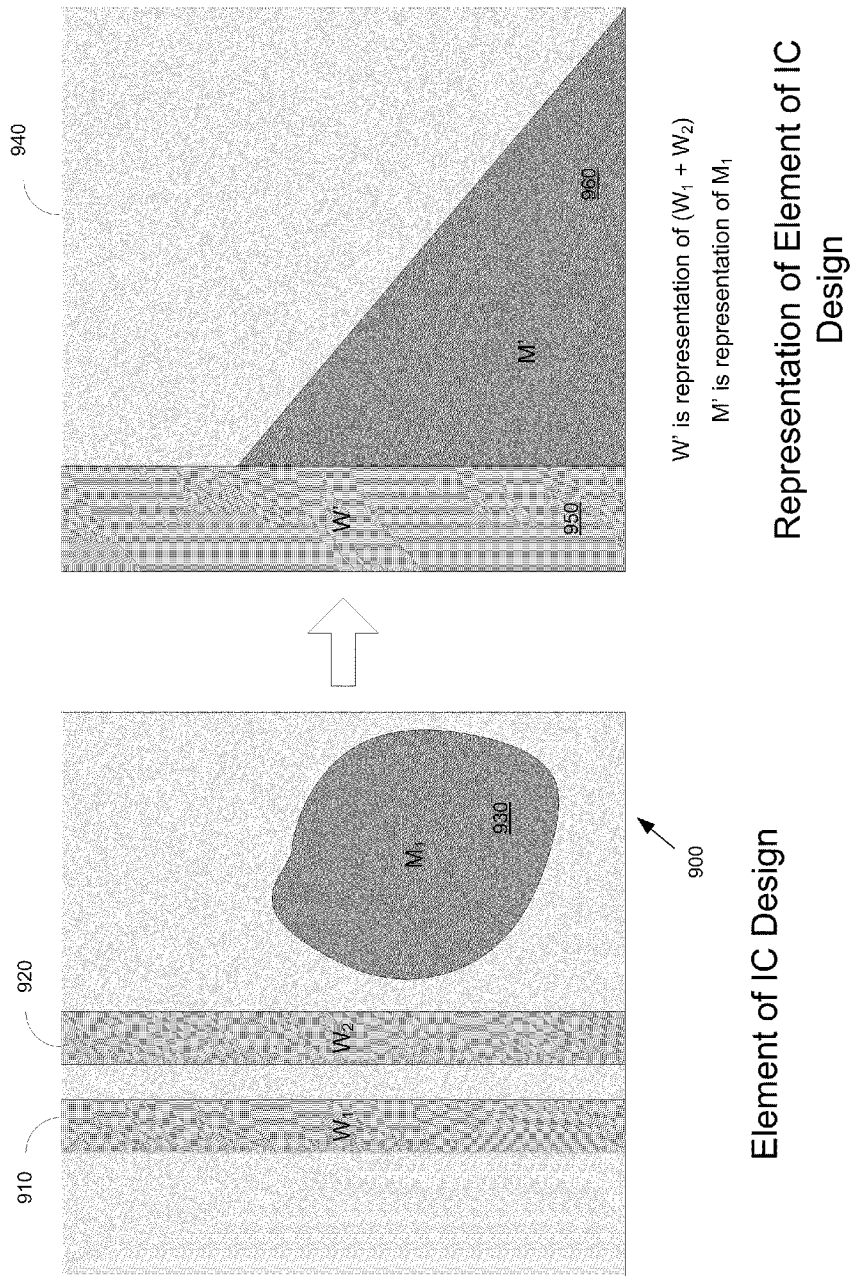
FIG. 9 illustrates an example of a particular element of the IC design layout that can be represented by an element model.

FIG. 9 illustrates an example of a particular element of an IC design layout that can be represented by an element model. As shown in this figure, the element 900 includes two vertical wires 910-920 and a residual area 930. In some embodiments, the residual area 930 is a conceptual illustration of non-dielectric components that are not full length wires. Partial length wires, vias, portion of a circuit module are examples of non-dielectric components, in some embodiments.

As further shown in FIG. 9, the element 900 can be represented by an element model 940. In this figure, the wires 910-920 are represented as wire 950 and residual area 930 is represented by residual area 960. The shape of the residual area 960 is triangular. However, different embodiments may use different shapes to represent the residual area 960.

Figure 10:
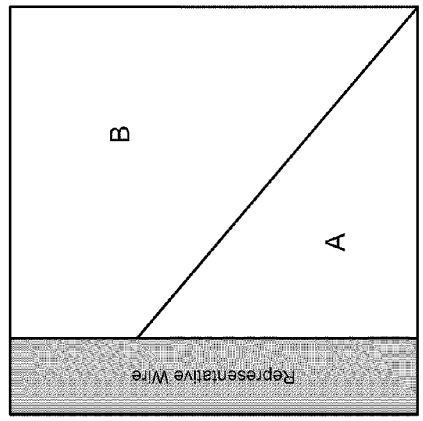
FIG. 10 illustrates several types of element model that can be used in some embodiments.
Figure 10:
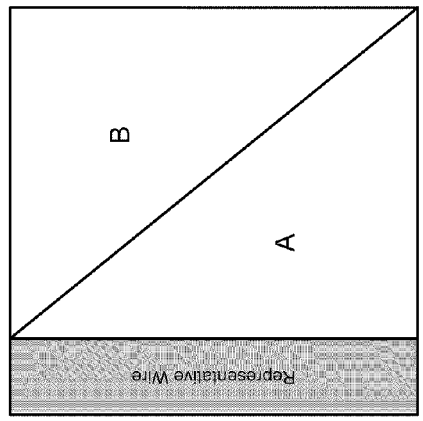
Figure 10:
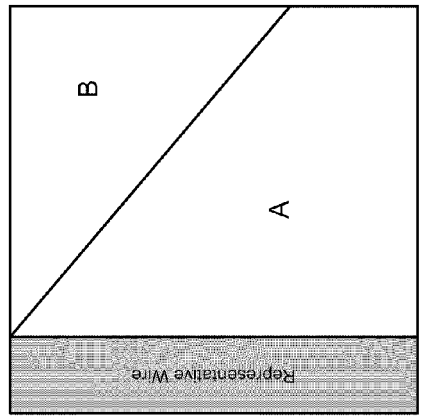

In addition, different embodiments may use different element models. FIG. 10 illustrates three different element models based on how large the residual area is relative to an area that includes the residual area (A) and the dielectric area (B). Once an element model is specified, an equivalent thermal conductivity value may be computed in some embodiments. Section ii below describes a method for computing an equivalent thermal conductivity value.

ii. Method for Computing Equivalent Thermal Conductivity Value

Figure 11:
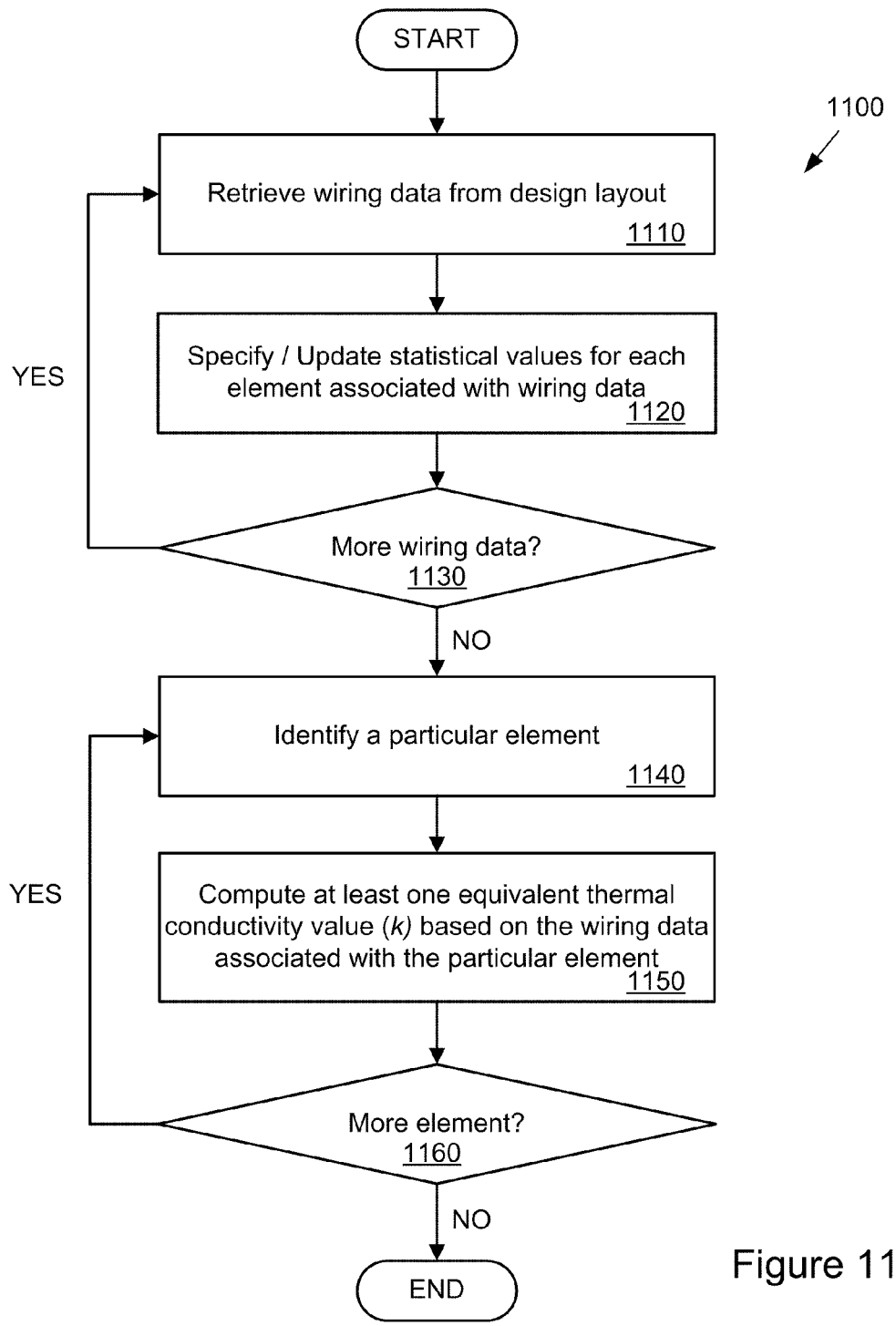
FIG. 11 illustrates a method for computing an equivalent thermal conductivity value.

FIG. 11 illustrates a method 1100 for computing an equivalent thermal conductivity value (k). In some embodiments, the method 1100 is performed after an IC design layout has been divided in sets of elements. As indicated above, each element may be uniform and may include a dielectric component, a wiring component, or a combination of dielectric and wiring components.

As shown in FIG. 11, the method 1100 retrieves (at 1110) wiring data from the IC design layout. In some embodiments, this includes retrieving a set of wiring segments that are associated with a first net of the IC design layout. The method 1100 then computes (at 1120) for each element, statistical values associated with the wiring data that is retrieved. In some embodiments, the statistical value includes the total width of full length wires in each element. In some embodiments, the total width is computed for a set of different directions (e.g., x, y). In addition, some embodiments also compute the total residual area of the element. In some embodiments, the total residual area may include partial length wires (e.g., wires that do not go through the entire element) and/or vias.

The method 1100 then determines (at 1130) whether there is more wiring data (e.g., whether there is one more net). If so, the method 1100 proceeds to 1110 to retrieve another set of wiring data (e.g., another set of wiring segments associated with another net) and then updates (at 1120) the statistical values for each element based on the other set of wiring data. In some embodiments, updating the statistical values includes adding the values of the width of the full length wires and area of the residual area to a previous total width and total residual area.

If the method 1100 determines (at 1130) there is no more wiring data to retrieve, the method 1100 then proceeds to identify (at 1140) a particular element from the set of elements. The method 1100 computes (at 1150) at least one equivalent thermal conductivity value for the particular element based on the wiring data that is associated with the particular element. The method for computing the equivalent thermal conductivity value will be further described below in detail.

After computing (at 1150) the equivalent thermal conductivity value, the method 1100 then determines (at 1160) whether there is another element. If so, the method 1100 proceeds to 1140 to identify another element and then computes (at 1150) an equivalent thermal conductivity value for this identified element. The method 1100 ends when there are no more elements to be identified.

Figure 12:
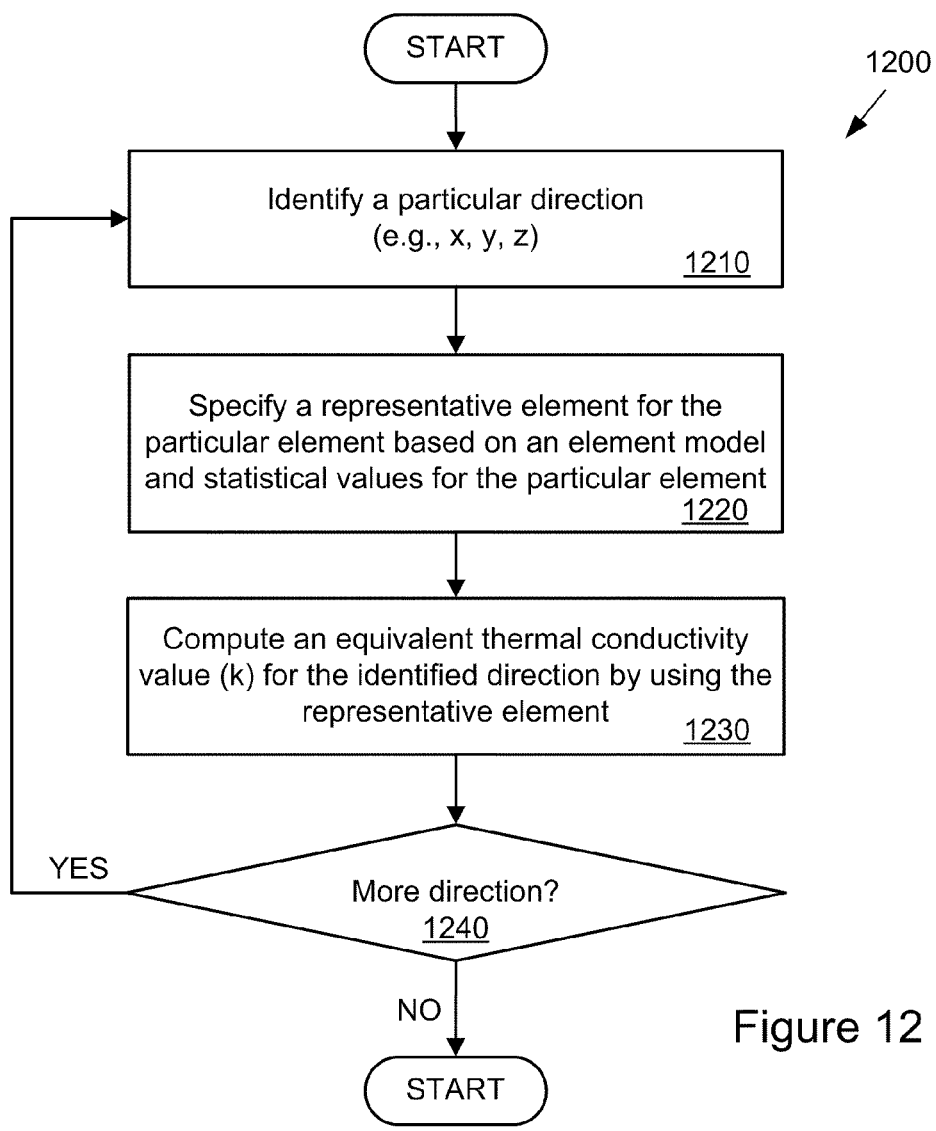
FIG. 12 illustrates a method for computing several equivalent thermal conductivity values along different directions.

FIG. 12 illustrates a method 1200 that some embodiments use to compute the equivalent thermal conductivity value during step 1150 of method 1100. As shown in this figure, the method 1200 identifies (at 1210) a particular direction for an element. The method 1200 then specifies (at 1220) a representative element for the particular element based on an element model and statistical values computed for the particular element. The method 1200 computes (at 1230) an equivalent thermal conductivity value based on the representative element.

Next, the method 1200 determines (at 1240) whether there is another direction for the element. If so, the method 1200 proceeds back to 1210 to identify another direction. If not, the method 1200 ends.

Figure 13:
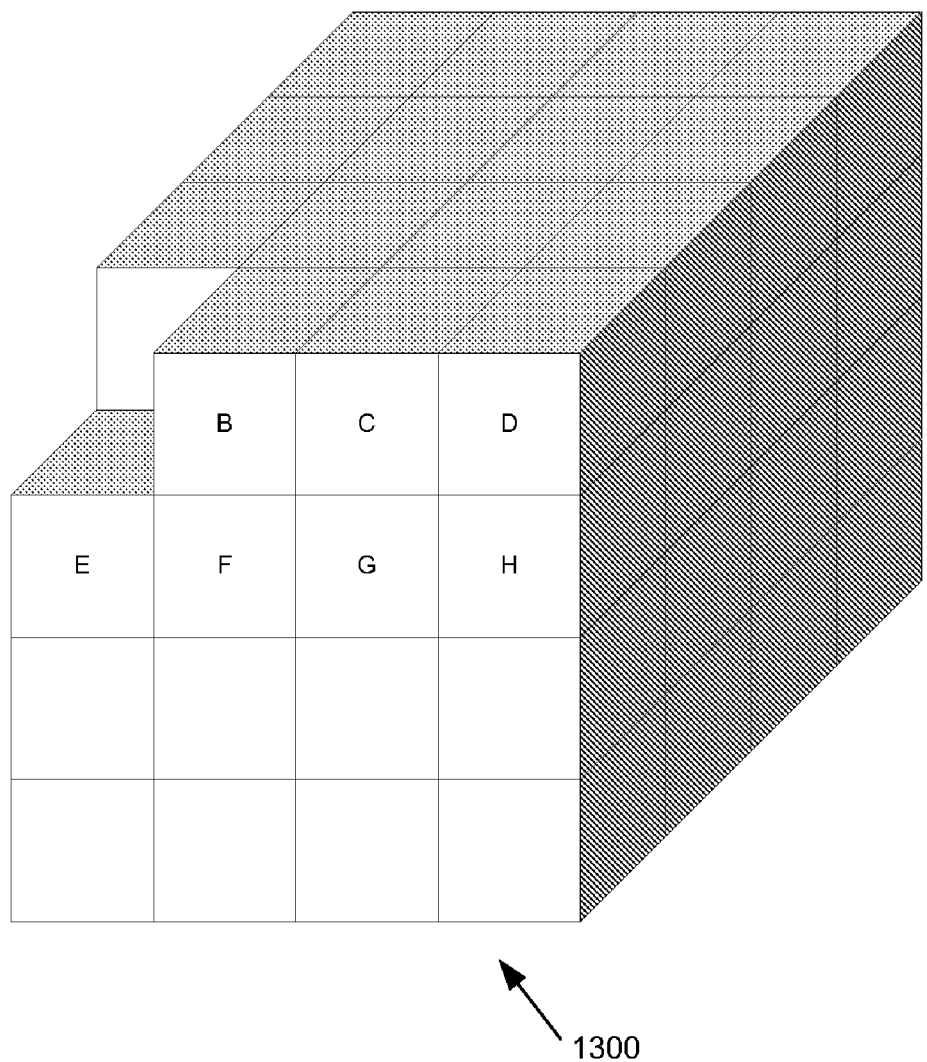
FIG. 13 illustrates a conceptual representation of thermal conductivity values that are computed for a particular element.
Figure 13:
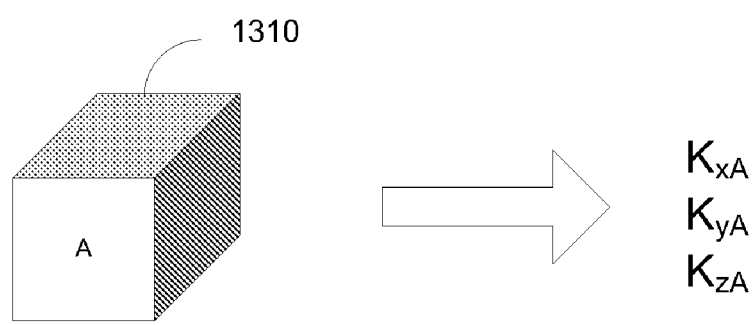

FIG. 13 illustrates a conceptual illustration of thermal conductivity values that are computed for a particular element 1310 from a set of elements 1300. As shown in this figure, for the element 1310, three equivalent thermal conductivity values are computed, one in the x-direction, one in the y-direction and one in the z-direction.

In some embodiments, once the equivalent thermal conductivity values have been computed for each element, these equivalent thermal conductivity values may be used in Equation (6) above to compute the element group of values.

Figure 14:
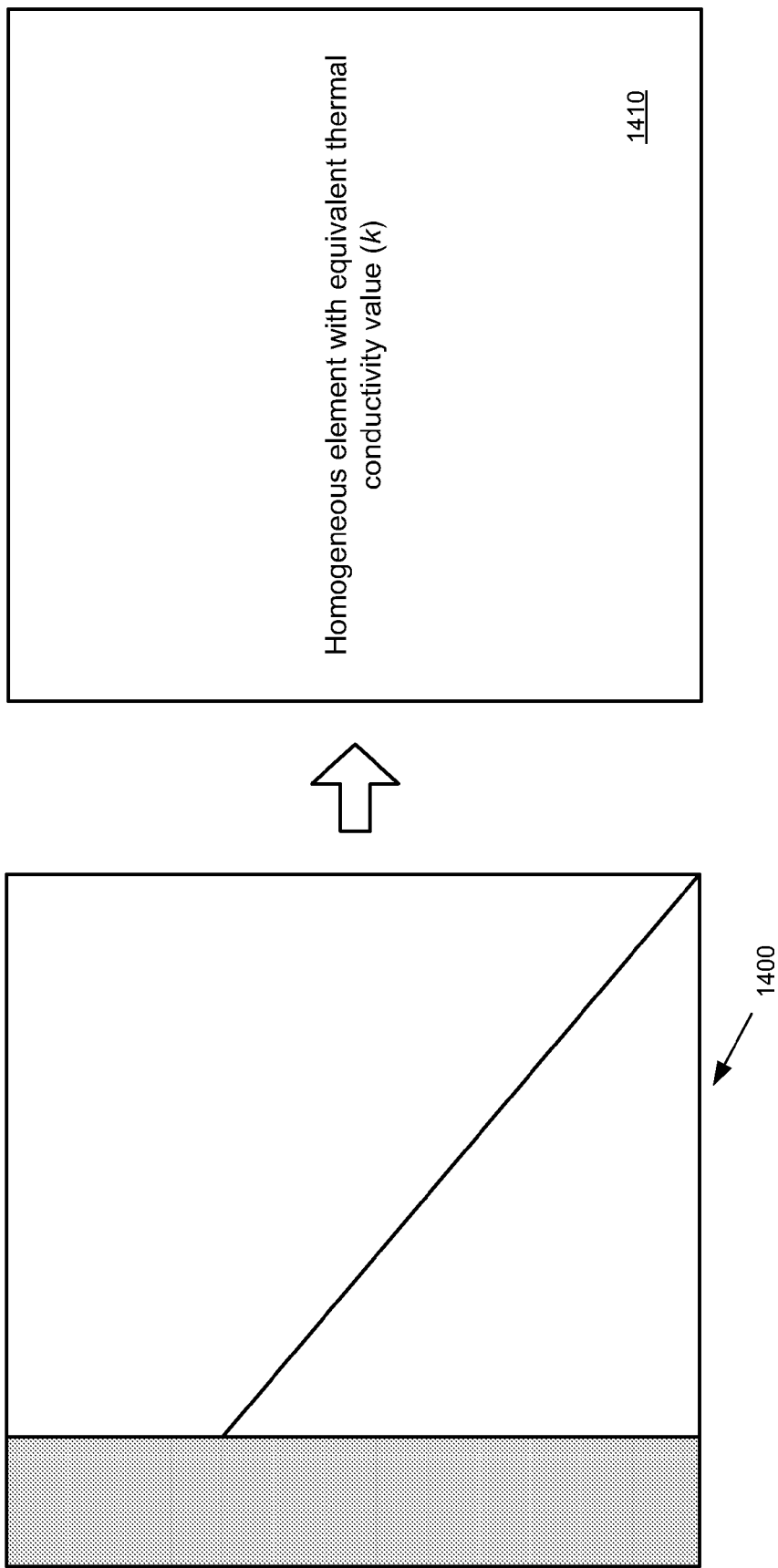
FIG. 14 illustrates the concept of an equivalent homogeneous element.

FIG. 14 conceptually illustrates the notion of an equivalent homogeneous element that is representative of a particular element that includes a wiring and/or residual metal area. As shown in FIG. 14, after an element model 1400 is identified for a particular element, some embodiments of the invention specify a particular homogeneous element 1410 with a particular equivalent thermal conductivity value.

An equivalent thermal conductivity value for an element can be computed by understanding the properties of a material as it relates to thermal conductivity. For example, the thermal conductance of a material is based on the thermal conductivity of the material. The reciprocal of a conductance of the material is the thermal resistance of the material. In some embodiments, the thermal resistance of the material is analogous to a resistance of a resistor in a circuit.

Figure 15:
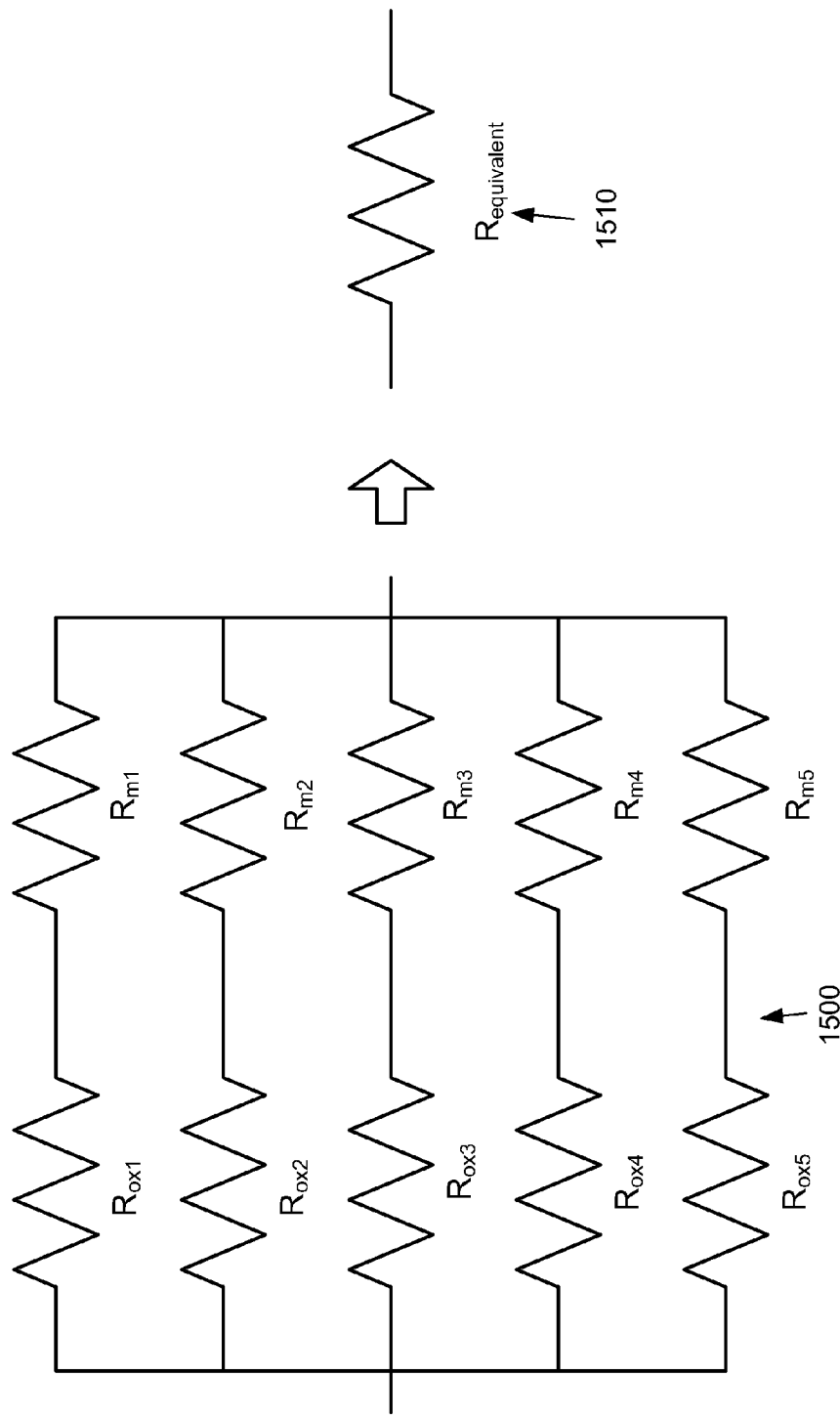
FIG. 15 illustrates the concept of computing an equivalent resistor for a particular circuit.

In view of this, an equivalent thermal resistance of the material, and thus ultimately an equivalent thermal conductivity value of the material can be computed under the same principles as computing an equivalent electrical resistance in a circuit. FIG. 15 conceptually illustrates how to compute an equivalent electrical resistor based on a set of resistors that are connected in series and in parallel in a particular electrical circuit. As shown in this figure, the circuit 1500 includes five paths in parallel to each other. Each of these paths includes two resistors in series. As further shown in FIG. 15, the equivalent resistor of the equivalent circuit 1510 can be computed by using Equation 1520.

Figure 16:
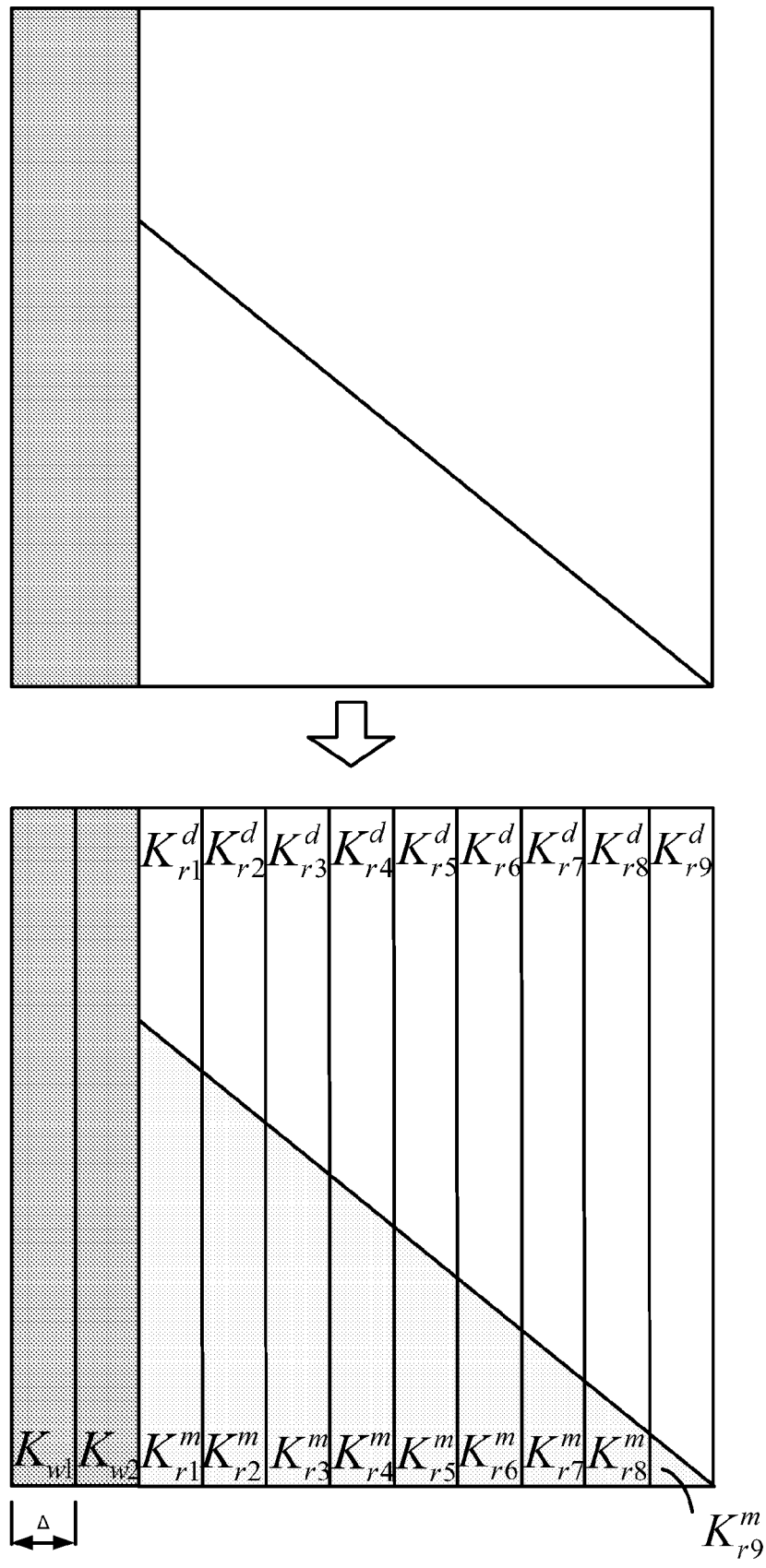
FIG. 16 illustrates the division of an element mode into delta sections.
Figure 17:
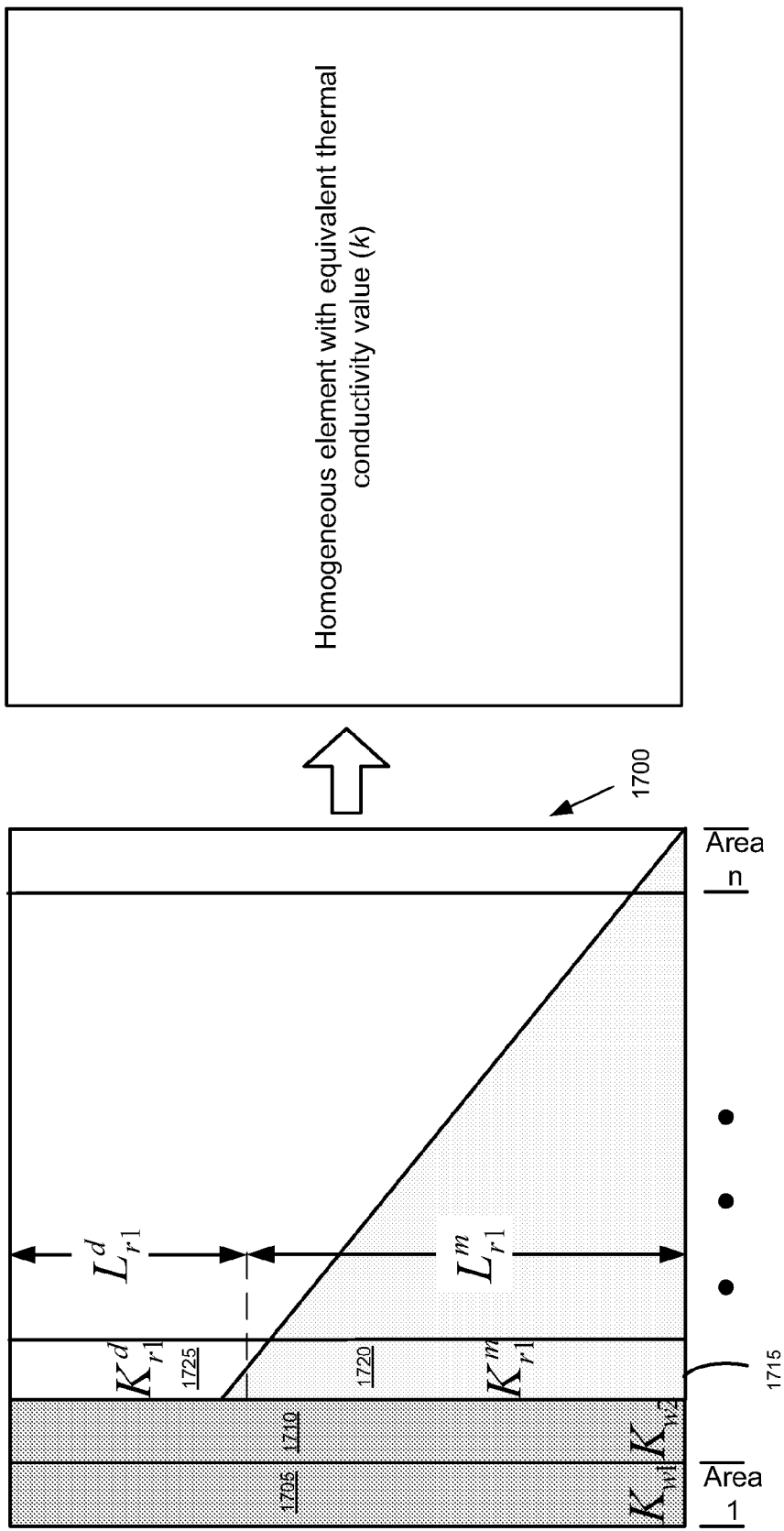
FIG. 17 illustrates the concept of computing an equivalent thermal conductivity value based on thermal conductivity values of the delta sections.

Some embodiments apply this principle to compute an equivalent thermal conductivity value for a particular element. FIG. 16 illustrates a particular element model that is divided into a set of areas. Each of these areas has a width of delta. Each area has a corresponding thermal conductivity value (e.g., $K_i$). The thermal conductivity of a particular area is based on the composition of the area. FIG. 17 illustrates an element 1700 that is divided into n areas, including areas 1705, 1710 and 1715. As shown in this figure, areas 1705 and 1710 have wiring. Therefore, the thermal conductivity value of each of these two areas is the thermal conductivity value of the wiring material (i.e., $K_w$). As further shown in FIG. 17, area 1715 includes metal component 1720 and dielectric component 1725 that each have their own respective thermal conductivity values $K_{r1}^m$ and $K_{r1}^d$, respectively. In some embodiments, the corresponding thermal conductivity value of an area that includes a metal component and a dielectric component can be computed by using the following equation, since the metal component and the dielectric can be considered as connected in series:

$$\frac{L_{r1}^d + L_{r1}^m}{K_{r1}} = \frac{L_{r1}^m}{K_{r1}^m} + \frac{L_{r1}^d}{K_{r1}^d}$$

where $K_{r1}$ is the thermal conductivity of the area that includes metal and dielectric components, $K_{r1}^m$ is the thermal conductivity of the metal component, $K_{r1}^d$ is the thermal conductivity of the dielectric component, $L_{r1}^m$ is the length of the metal component in the area, $L_{r1}^d$ is the length of the dielectric component in the area.

Rearranging the above equation yields the following equation, which can be used to compute the corresponding thermal conductivity of a particular first area that includes metal and dielectric components:

$$K_{r1} = \frac{(L_{r1}^d + L_{r1}^m) \times K_{r1}^m \times K_{r1}^d}{(L_{r1}^m \times K_{r1}^d) + (L_{r1}^d \times K_{r1}^m)}$$

To compute the equivalent thermal conductivity value of a particular element, some embodiments use an average value of the thermal conductivity value of all areas of the particular element. The average value can be computed by using the equation below.

$$K_{Equivalent} = \frac{1}{n} \sum K_i$$

where $K_i$ is the thermal conductivity value of a particular area i. However, different embodiments may compute an equivalent thermal conductivity value differently.

iii. Reducing the Number of Different Equivalent Thermal Conductivity Values

Figure 18:
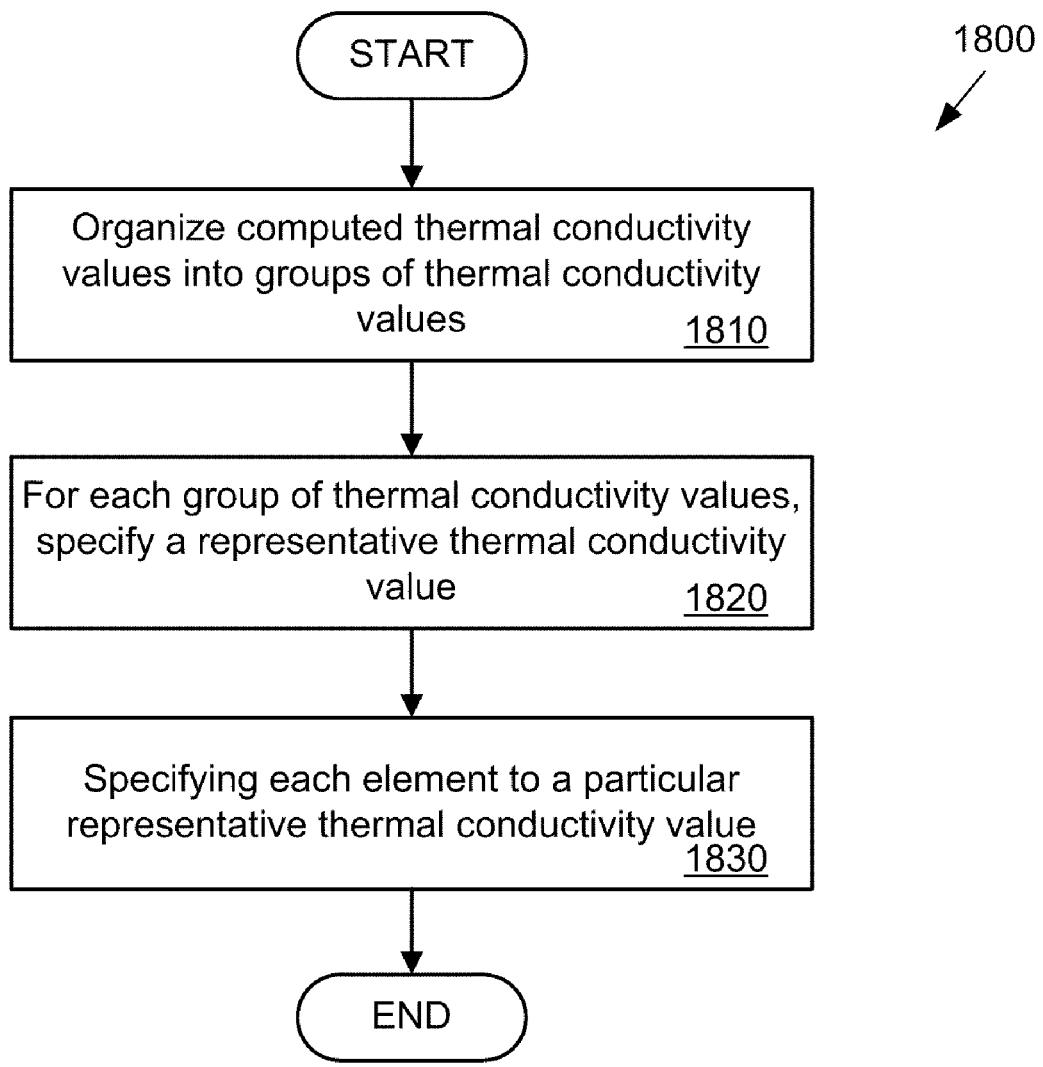
FIG. 18 illustrates a method for binning thermal conductivity values.

In some embodiments, computing an equivalent thermal conductivity value for each element produces many different equivalent thermal conductivity values. Some embodiments of the invention may reduce the number of different equivalent thermal conductivity values that may be assigned to the elements. FIG. 18 illustrates how the number of different thermal conductivity values may be reduced in some embodiments. As shown in FIG. 18, the method 1800 organizes (at 1810) the thermal conductivity values into groups of thermal conductivity values. Different embodiments may groups these thermal conductivity values differently. For example, all thermal conductivity values that are within a threshold value of a first value may be grouped together in a first group and all thermal conductivity values that are within the threshold value of a second value may be grouped in a second group.

Once the thermal conductivity values have been grouped, the method 1800 specifies (at 1820) a representative thermal conductivity value for each group of thermal conductivity values. In some embodiments, the representative thermal conductivity value is an average thermal conductivity values in each particular group. However, different embodiments may specify representative values differently. For example, some embodiments may specify a median thermal conductivity values for each group.

Once the representative thermal conductivity values are specified (1820), the method 1800 specifies (at 1830) a particular representative thermal conductivity value for each element. Thus, in some embodiments, all elements that are associated with a particular group may specify the same equivalent thermal conductivity value.

Figure 19:
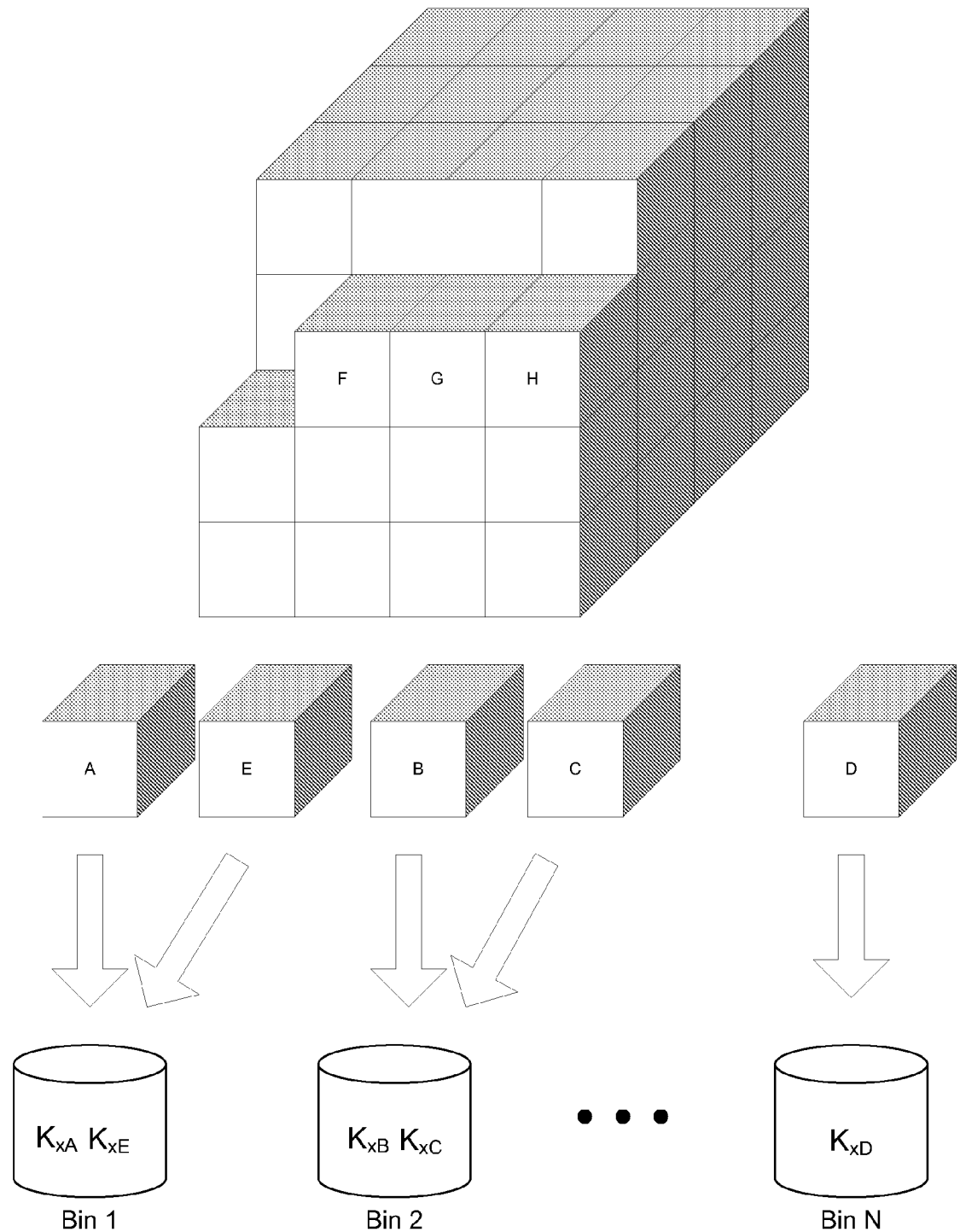
FIG. 19 illustrates a conceptual representation of binning thermal conductivity values.

FIG. 19 conceptually illustrates the method of FIG. 18 being implemented in some embodiments. As shown in FIG. 19, the equivalent thermal conductivity in the x-direction for each element is associated to a particular bin (e.g., group) from a set of bins (e.g., groups). Different embodiments may associate the equivalent thermal conductivity values differently. For example, different bins may be used for each particular direction. In addition, a group (e.g., bin) may include thermal conductivity values for different directions. In some embodiments, the entire range of possible equivalent thermal conductivity values in each spatial direction is divided into segments (e.g., bins with equal size). Some embodiments store the minimum equivalent thermal conductivity value as well as the bin size. In addition, each particular element is associated with a set of bin indices to specify which thermal conductivity bins each particular element falls into. The representative thermal conductivity can be computed on the fly based on those indices, the saved minimum equivalent thermal conductivity, and the bin size. Moreover, some embodiments store at least one thermal conductivity difference value relative to at least one of the minimum thermal conductivity values.

B. Computing an Element Group of Values that Accounts for Wiring

Figure 20:
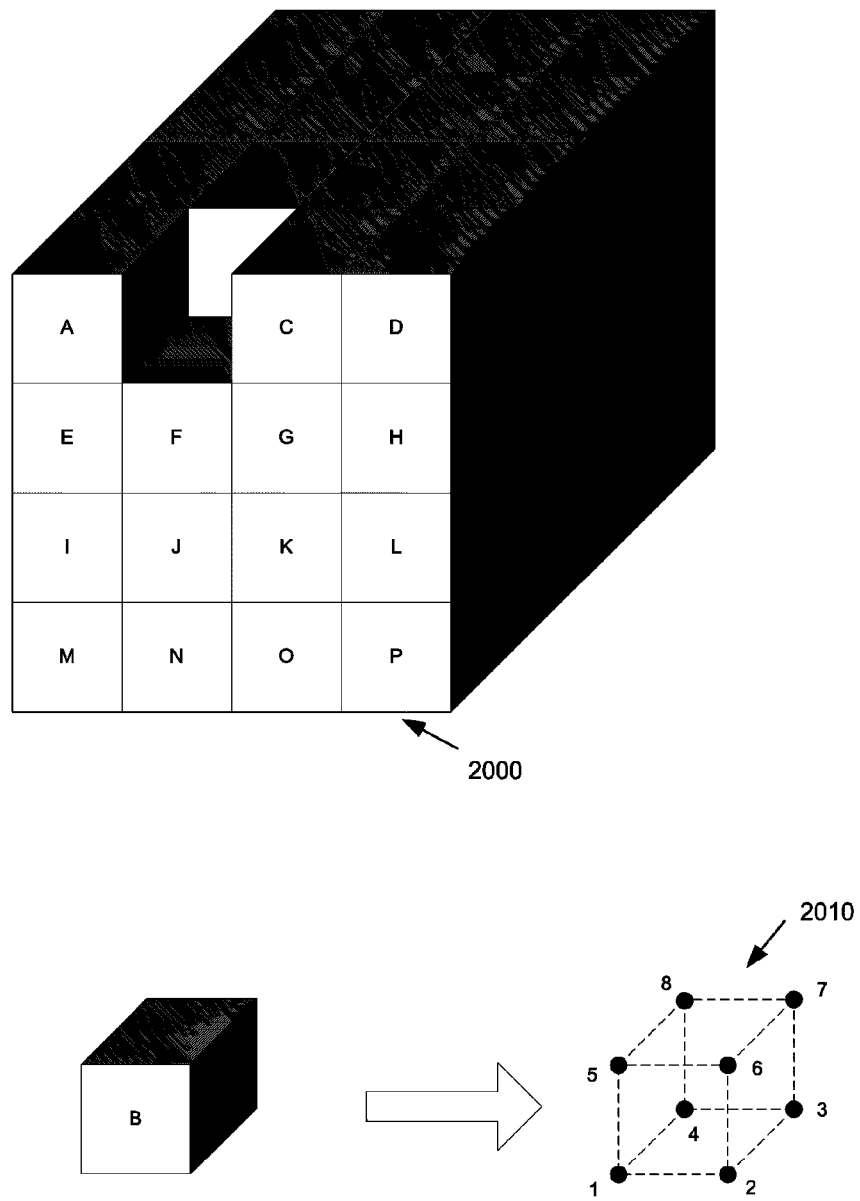
FIG. 20 illustrates a set of elements for an IC design layout, where each element includes eight nodes.

Some embodiments of the invention compute an element group of values that accounts for wiring by using parameterized functions obtained by carrying out a symbolic integration of a set of finite element equations for a set of wire location parameters. The set of finite element equations for heat transfer are well established and can be found for example in the book entitled "The Finite Element Method," 3rd ed. McGraw-Hill Book Company, New York, N.Y., 1977, by O. C. Zienkiewicz. The above book is hereinafter incorporated by reference. As mentioned above, the values of the element group of values are associated with entry values (e.g., $C_{ij}$). FIG. 20 illustrates an example of an IC design layout that is divided into several elements 2000. FIG. 20 further illustrates that each element includes eight nodes. In some embodiments, each element is associated with an n×n symmetric matrix (i.e., element matrix). For example, the element 2010 is associated with an 8×8 symmetric matrix, as shown below:

$$H = \begin{pmatrix} C_{11} & \ldots & C_{18} \\ \ldots & \ldots & \ldots \\ C_{81} & \ldots & C_{88} \end{pmatrix}$$

In some embodiments, the entry $C_{ij}$ describes how the heat flow at node i is affected when the temperature at node j changes. In addition, each node i in the element is associated with a shape function $N_i(x, y, z)$, as described above for Equation (6). In some embodiments, the shape functions associated with different nodes differ from each other. In some embodiments, the entry $C_{ij}$ in the matrix is calculated by using the following equation:

$$C_{ij} = \int_\omega \left[ k_x(x, y, z) \frac{\partial N_i(x, y, z)}{\partial x} \frac{\partial N_j(x, y, z)}{\partial x} + k_y(x, y, z) \frac{\partial N_i(x, y, z)}{\partial y} \frac{\partial N_j(x, y, z)}{\partial y} + k_z(x, y, z) \frac{\partial N_i(x, y, z)}{\partial z} \frac{\partial N_j(x, y, z)}{\partial x} \right] d\omega$$

where ω represents the volume of the element. To account for wiring, some embodiments consider the effects of metal wires as incremental additions of thermal conductivity to the element material. As a result, in some embodiments, the entry $C_{ij}$ is calculated by using the following equation:

$$C_{ij} = C_{ij\_dielectric} + \sum_{wires} \int_\omega \left[ \delta k_x(x, y, z) \frac{\partial N_i(x, y, z)}{\partial x} \frac{\partial N_j(x, y, z)}{\partial x} + \delta k_y(x, y, z) \frac{\partial N_i(x, y, z)}{\partial y} \frac{\partial N_j(x, y, z)}{\partial y} + \delta k_z(x, y, z) \frac{\partial N_i(x, y, z)}{\partial z} \frac{\partial N_j(x, y, z)}{\partial z} \right] d\omega$$

where $C_{ij\_dielectric}$ represents the value of $C_{ij}$ when the element is completely occupied by a dielectric. In some embodiments, the value $C_{ij\_dielectric}$ is computed once for each element. The summation in the above equation is a summation of the wires that are added to the particular element. In some embodiments, $\delta k_x(x, y, z)$, $\delta k_y(x, y, z)$, and $\delta k_z(x, y, z)$ represent the incremental conductivity when a wire segment is added to the particular element.

In some embodiments, performing a numerical integration of the above equation can be computationally extensive (i.e., it can take a long time). Accordingly, some embodiments parameterize the above equation to obtain the following parameterize function:

$$\int_\omega \delta k_x(x, y, z) \frac{\partial N_i(x, y, z)}{\partial x} \frac{\partial N_j(x, y, z)}{\partial x} d\omega = f_{i,j,x}(x_1, y_1, z_1, x_2, y_2, z_2, a, b, c, x_0, y_0, z_0)$$

where $x_1, y_1, z_1$ are the coordinates of the lower left corner of a wire in the element, $x_2, y_2, z_2$ are the coordinates of the upper right corner of the wire in the element, a, b, c are the width, depth, and height of the element, and $x_0, y_0, z_0$ are the coordinates of the lower left corner of the element, respectively. See e.g., FIG. 22. Note that the function name itself is indexed by i, j, and x, which signifies that this function describes the x relationship between nodes i and j. Similarly, functions $f_{i,j,y}(x_1, y_1, z_1, x_2, y_2, z_2, a, b, c, x_0, y_0, z_0)$ and $f_{i,j,z}(x_1, y_1, z_1, x_2, y_2, z_2, a, b, c, x_0, y_0, z_0)$ can be defined for the y and z direction. In some embodiments, these are all symbolic functions, and once the values of $x_1, y_1, z_1, x_2, y_2, z_2$ are known, the functions can easily be used to evaluate or compute the entry values of elements. The use of the functions is further described below in conjunction with computing an element group of values.

Figure 21:
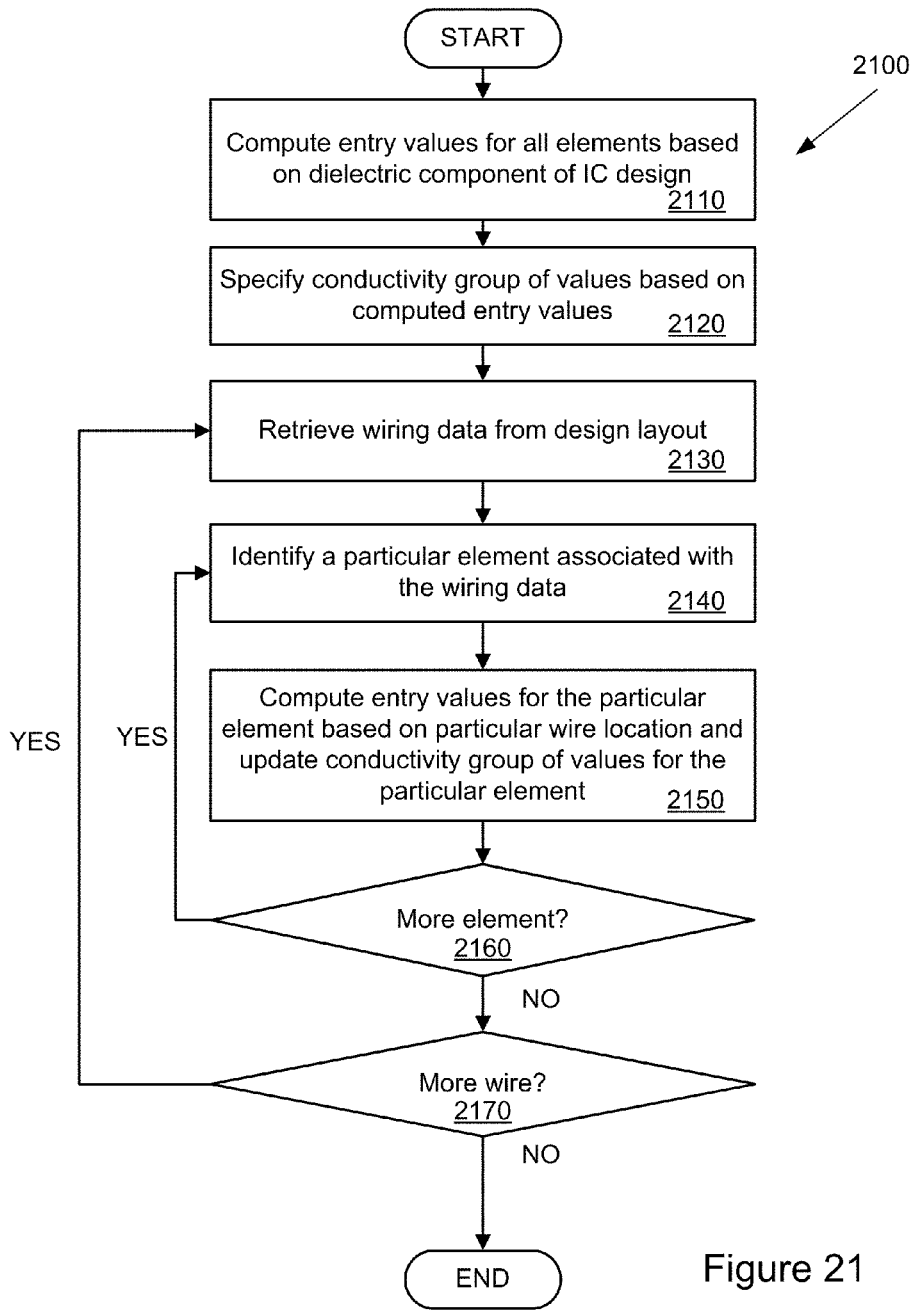
FIG. 21 illustrates a method for computing a conductivity group of values that take into account the wiring of the IC design layout.

FIG. 21 illustrates a method 2100 that is performed to compute an element group of values that accounts for wiring in some embodiments. In some embodiments, the method 2100 is performed after the IC design layout has been divided into a set of elements, as shown in FIG. 20.

The method 2100 computes (at 2110) node values for all the elements of the IC design based on the dielectric component of the IC design. The method 2100 specifies (at 2120) for each element, an element group of values based on the computed entry values. In some embodiments, the method 2100 uses Equation (6) to compute the entry values and specify the element group of values.

The method 2100 then retrieves (at 2130) wiring data from the IC design layout. In some embodiments retrieving wiring data includes retrieving one or more wire segments associated with a first net. The method 2100 identifies (at 2140) a particular element associated with the wiring data. The method 2100 computes (at 2150) entry values based on the retrieved wiring data and updates the element group of values for the particular element based on the computed entry values.

Figure 22:
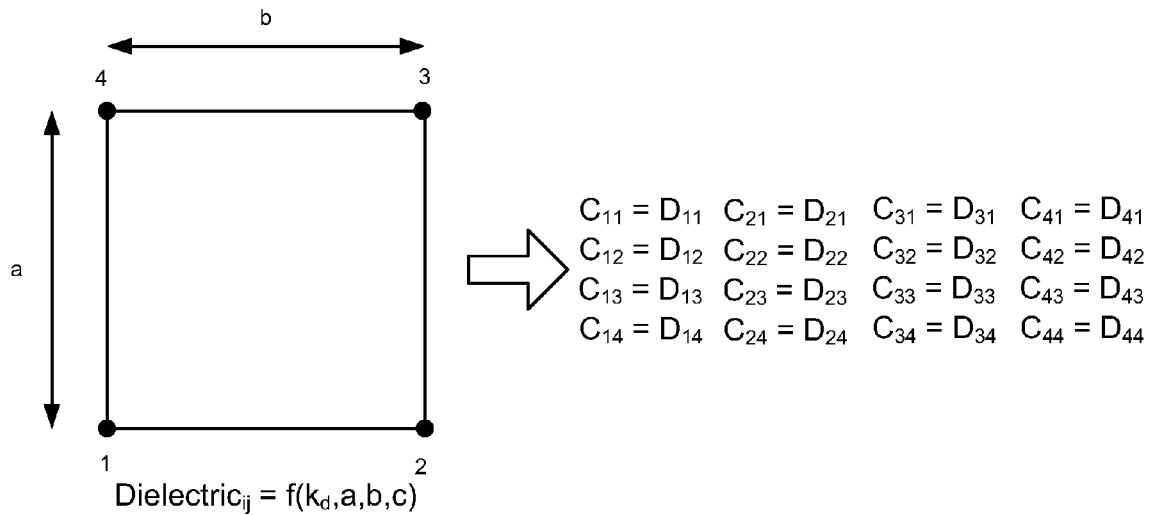
FIG. 22 illustrates the concept of computing a conductivity group of values.
Figure 22:
Figure 22:
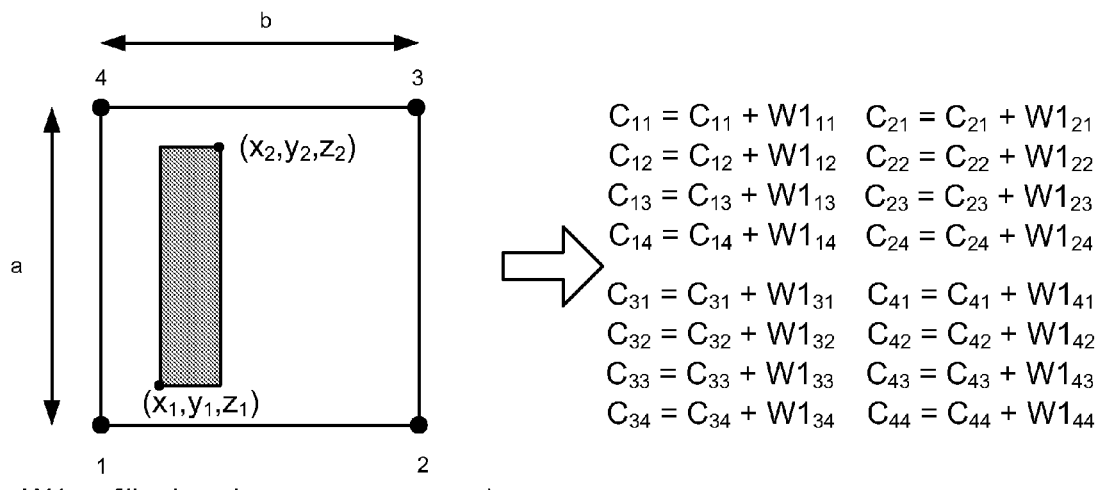
Figure 23:
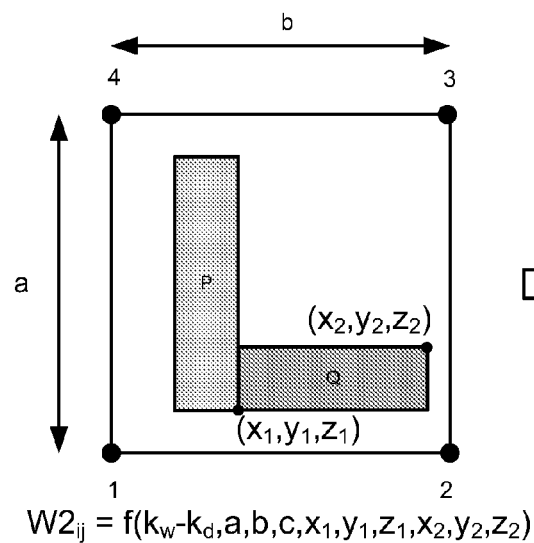
FIG. 23 illustrates the concept of computing another set of conductivity group of values.

In some embodiments, computing the entry value includes using the parameterized functions described above. FIG. 22 illustrates how entry values are computed based on wiring data in some embodiments. However, different embodiments may compute different numbers of entry values. In some embodiments, eight entry values are computed for each node. The top portion of FIG. 22 conceptually illustrates the computation (at 2110) of entry values based on a dielectric value for the element. The bottom portion of FIG. 22 conceptually illustrates the computation (at 2150) of entry values based on a wiring in the element. FIG. 23 conceptually illustrates the computation (at 2150) of entry values based on another wire from the same net as the wire in FIG. 22. In some embodiments, once these entry values are computed, they are added (at 2150) to any previously computed entry values.

The method 2100 then determines (at 2160) whether there is another element that is associated with the retrieved wiring data. If so, then the method 2100 proceeds back to 2140 to identify another element. However, when the method 2100 determines (at 2160) there is no other element associated with the retrieved wiring data, the method 2100 determines (at 2170) whether there is more wiring data to be retrieved from the IC design layout (e.g., is there another net). If so, the method 2100 proceeds to retrieve (at 2130) another wiring data from the IC design layout.

The above sequence for computing entry values can be illustrated with the following example. FIG. 23 shows an element that includes two wires P and Q, characterized by $(xp_1, yp_1, zp_1, xp_2, yp_2, zp_2)$ and $(xq_1, yq_1, zq_1, xq_2, yq_2, zq_2)$ that are added consecutively in the element. In some embodiments, before any wire is added to the element, the value of entry $C_{12}$ in the element group of values is equal to the value associated with the dielectric of the element (i.e., $C_{12} = C_{12\_dielectric}$).

Once the first wire (P) is added to the element, the value of entry $C_{12}$ is equal to the entry value associated with the dielectric plus the values associated with the parameterized functions solved using values of wire P. In other words, $$C_{12} = C_{12\_dielectric} + f_{1,2,x}(xp_1, yp_1, zp_1, xp_2, yp_2, zp_2, a, b, c, x_0, y_0, z_0) +$$
$$f_{1,2,y}(xp_1, yp_1, zp_1, xp_2, yp_2, zp_2, a, b, c, x_0, y_0, z_0) +$$
$$f_{1,2,z}(xp_1, yp_1, zp_1, xp_2, yp_2, zp_2, a, b, c, x_0, y_0, z_0)$$

Similarly, after the second wire (Q) is added to the element, the value of entry $C_{12}$ is equal to $$C_{12} = C_{12\_dielectric} + f_{1,2,x}(xp_1, yp_1, zp_1, xp_2, yp_2, zp_2, a, b, c, x_0, y_0, z_0) +$$
$$f_{1,2,y}(xp_1, yp_1, zp_1, xp_2, yp_2, zp_2, a, b, c, x_0, y_0, z_0) +$$
$$f_{1,2,z}(xp_1, yp_1, zp_1, xp_2, yp_2, zp_2, a, b, c, x_0, y_0, z_0) +$$
$$f_{1,2,x}(xp_1, yp_1, zp_1, xp_2, yp_2, zp_2, a, b, c, x_0, y_0, z_0) +$$
$$f_{1,2,y}(xp_1, yp_1, zp_1, xp_2, yp_2, zp_2, a, b, c, x_0, y_0, z_0) +$$
$$f_{1,2,z}(xp_1, yp_1, zp_1, xp_2, yp_2, zp_2, a, b, c, x_0, y_0, z_0)$$

As shown above, the computed values based on the parameterized functions are added to the previous entry values, in some embodiments.

Figure 24:
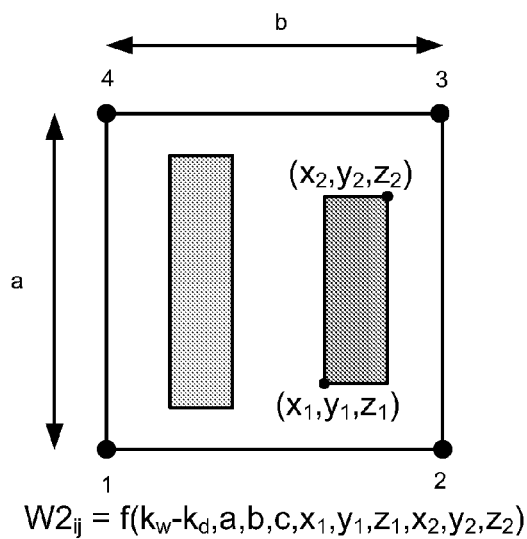
FIG. 24 illustrates the concept of computing another set of conductivity group of values for a wire of another net.
Figure 25:
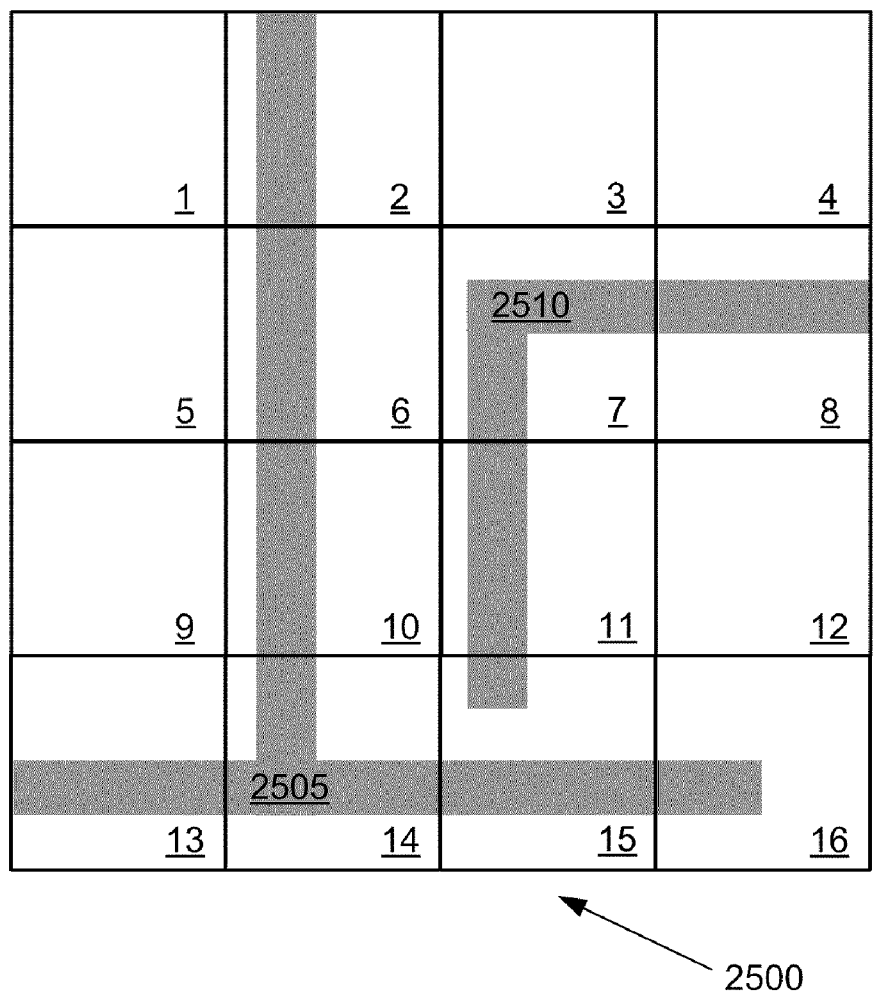
FIG. 25 illustrates several elements of an IC design layout that includes two nets.

Different embodiments may add wires in one or more elements differently. One implementation of a sequence for adding wires and computing entry values in the method 2100 will now be described with respect to FIGS. 24 and 25. FIG. 24 conceptually illustrates the computation (at 2150) of entry values based on another wire from a different net. As shown in this figure, the computation of this wire is similar to the wire in FIG. 23. FIG. 25 illustrates a subset 2500 of an IC design layout that is divided into sixteen (16) elements. As further shown in this figure, the IC design layout includes a first net 2505 and a second net 2510. In some embodiments, when the method 2100 is performed on the subset 2500, node values associated with elements 2, 6, 10, and 13-16 are first computed since these elements are associated with the first net 2505. Once the entry values have been computed for these elements, some embodiments then compute entry values associated with elements 7-8, 11 and 15, which are associated with the second net 2510. However, different embodiments may process these elements in a different sequence. For example, some embodiments may first process elements associated with the second net 2510 and then process elements associated with the first net 2505.

Once the element groups of values are computed, they can be used to solve the heat flow equation to compute the temperature distribution of the IC design layout, where the temperature distribution takes into account the wiring in the IC design layout. The solving of the heat flow equation will now be further described below in Section V.

V. Solving the Heat Flow Equation

As mentioned above, the process 400 computes (at 415) two coefficients α and β for each circuit module in the design, and uses these two coefficients to specify (at 420) a heat flow equation that is expressed partly in terms of exponential leakage power consumption models of the circuit modules. After defining the heat flow equation, the process 400 uses (at 425) a matrix solver to iteratively solve the heat flow equation.

Figure 26:
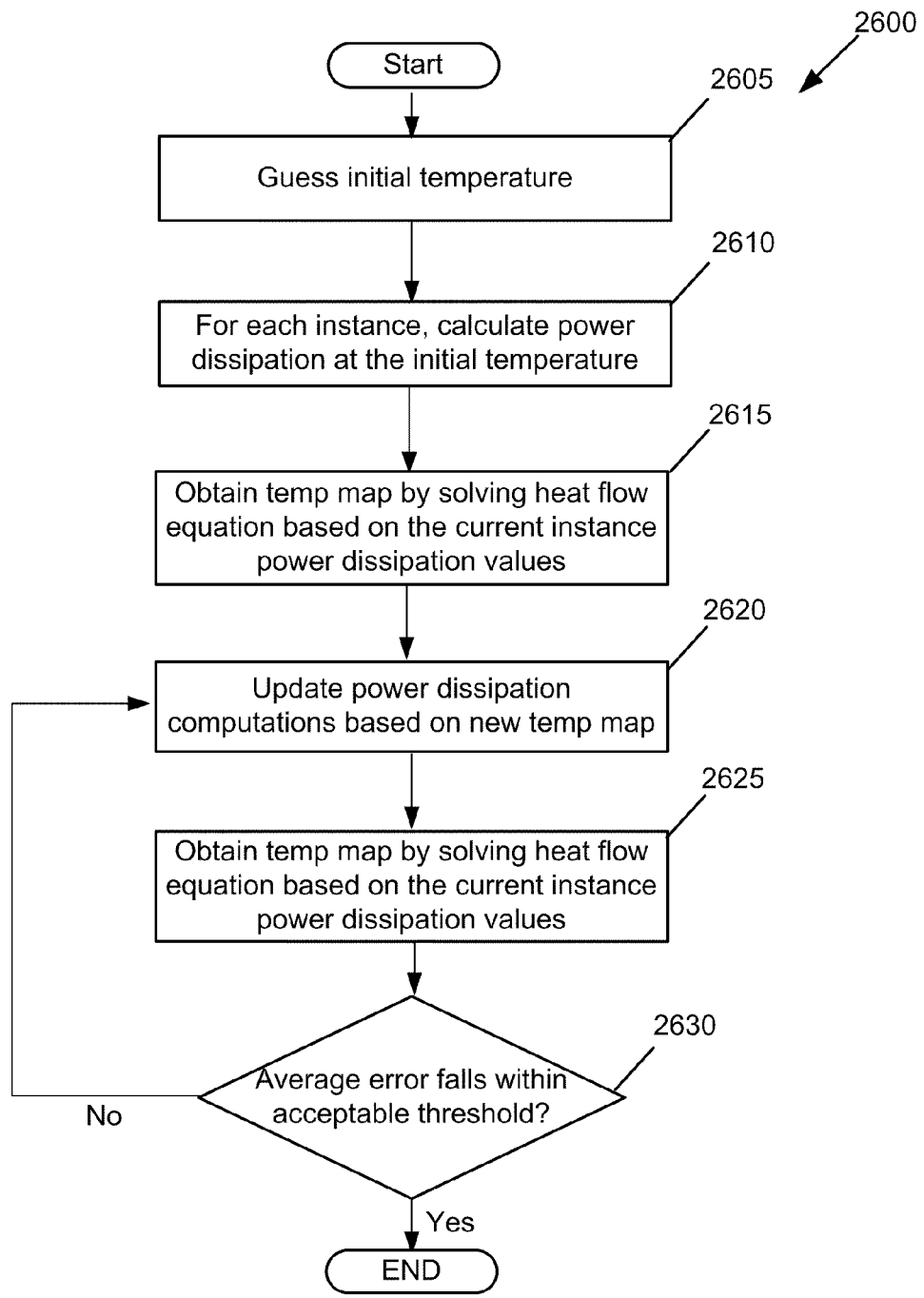
FIG. 26 illustrates a solving process that some embodiments use to solve the heat flow equation.

FIG. 26 illustrates a solving process 2600 that some embodiments use (at 425) to solve the heat flow equation. As shown in this figure, the process initially selects (at 2605) an initial estimate for the temperature several nodes in the design. As mentioned above, some embodiments divide the IC design layout into a number of bricks (also called elements) whose vertices are the nodes for which the temperatures are computed.

Next, the process calculates (at 2610) the power dissipation of each circuit module based on the current temperature of the particular circuit module and its non-linear temperature-dependent power consumption model. As mentioned above, the process 400 identifies (at 415) an exponential power consumption model for each circuit module.

The process 2600 then uses (at 2615) these power dissipation values to solve the heat flow equation to produce a new temperature distribution. In some embodiments, the process uses a numerical matrix solver to produce the new temperature distribution. The matrix solver first factorizes the conductivity group of values C using LU or Cholesky factorization and then solves the equations via forward/backward substitution.

The solution to the heat flow equation is a vector of temperature values that correspond to the temperatures of the nodes of the elements that divide the IC design. This vector provides an initial temperature distribution for the IC. The distribution gives the steady-state temperature on the IC as a function of spatial coordinates x, y, and z given the power dissipation values that were calculated (at 2610) based on the initial temperature guessed at 2605.

The process next updates (at 2620) the power dissipation values using the temperature values produced at 2615. The process calculates (at 2620) the power dissipation of each circuit module again based on the interpolated temperature of the particular circuit module (i.e., the temperature interpolated from the current temperature of its nearby nodes) and its non-linear temperature-dependent power consumption model (e.g., its exponential power consumption model). These new power dissipation values are based on the calculated temperature distribution as opposed to the initial estimated temperature distribution.

After 2620, the process uses (at 2625) the power dissipation values calculated at 2620 to solve the heat flow equation to produce a new temperature distribution. As before, the process uses a numerical matrix solver to produce the new temperature distribution. The solution to the heat flow equation is again a vector of temperature values that correspond to the temperatures of the different nodes of the elements that divide the IC design layout. This vector provides a calculated temperature distribution for the IC. This distribution again provides the steady-state temperature on the IC as a function of spatial coordinates x, y, and z given the power dissipation values that were calculated (at 2620).

Next, the process compares (at 2630) the last two temperature distributions that it obtained by solving the heat flow equation. In the first iteration through 2630, the process compares the temperature distribution computed at 2615 with the temperature distribution computed in the first iteration through 2625. In subsequent iterations through 2630, the process compares the last two temperature distributions that were computed in the last two iterations through 2625.

In some embodiments, the comparison of the two temperature distributions (at 2630) entails a computation of the average difference between the temperature values at each node in the design layout in the two maps divided by the average temperature value on the new map. When the average error is within a particular threshold (e.g., less than a predefined threshold), the process ends and outputs the new temperature distribution.

However, when the average error computed at 2630 is not within the threshold, the process 2600 repeats operations 2620, 2625, and 2630. Specifically, the process uses (at 2620)

the new temperature distribution to update the power dissipation values again, uses (at 2625) the new power dissipation values to obtain a new temperature distribution, and then compares (at 2630) the new temperature distribution with the prior temperature distribution to determine whether the average error falls within the predefined threshold.

As mentioned above, the process 2600 continues until the difference between two subsequently calculated temperature distributions is small enough that, when compared at 2630, the average error falls below the specified threshold. The solution computed in the final iteration through 2625 is the temperature vector T that represents the temperature distribution across the IC design layout (i.e., the temperature of various nodes).

Figure 27:
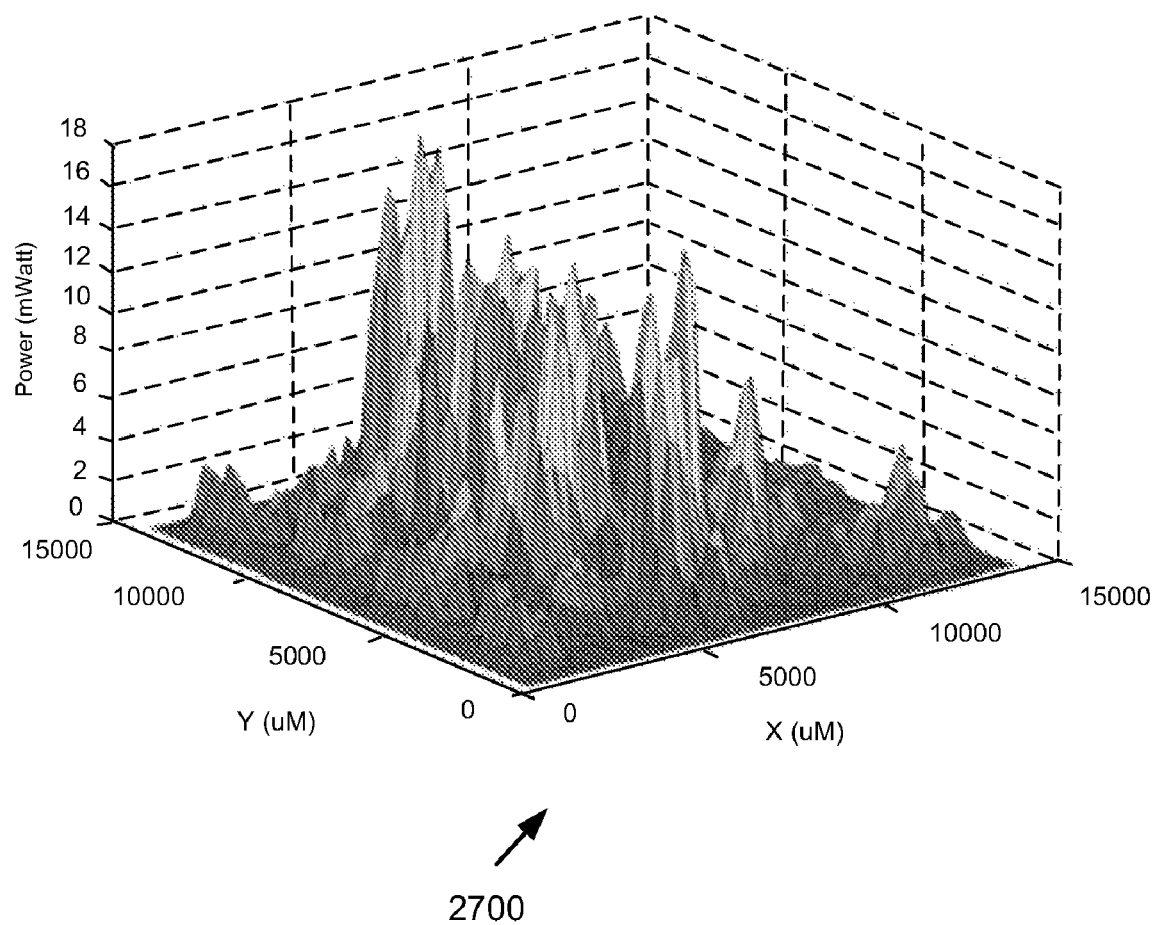
FIG. 27 illustrates a power distribution map.

The IC design's estimated power consumption can be computed by using this temperature distribution and the equations (6)-(8) that are described above. In addition, some embodiments use the temperature map obtained at 425 to obtain a power distribution map such as that illustrated in FIG. 27. Similar to the temperature map, the power distribution 2700 plots total power consumption in milliwatts as a function of spatial coordinates x, y, z on the IC.

In addition to monitoring power consumption, the thermal analysis provided by processes 400 and 2600 can be used to select the best packaging for a chip. For instance, the analysis allows a designer to select from several packages a cost effective package that prevents any section from overheating, avoids problematic temperature gradients, etc. Proper packaging can help keep a chip from overheating by conducting heat away from the chip. Sometimes better, but more expensive, packaging may be needed in order to prevent thermal runaway.

This analysis can also be used to perform better timing analysis, which is often dependent on the power consumption analysis. Temperature gradients on an IC can affect signal delays. Therefore, it is necessary to know the temperature distribution throughout the IC in order to compute accurate timing analysis.

The advantage of the above-described processes 400 and 2600 is that they can be performed much more quickly than prior solutions, which separated out the thermal analysis and power analysis into separate programs that required numerous power-dissipation and thermal-analysis iterations.

Another advantage of these processes is that it is easy to detect thermal run-away. For instance, some embodiments quickly identify a thermal run-away when the average error computed by process 2600 at 2630 in one iteration is greater than the average error computed by process 2600 at 2630 in a prior iteration.

VI. Computer System

Figure 28:
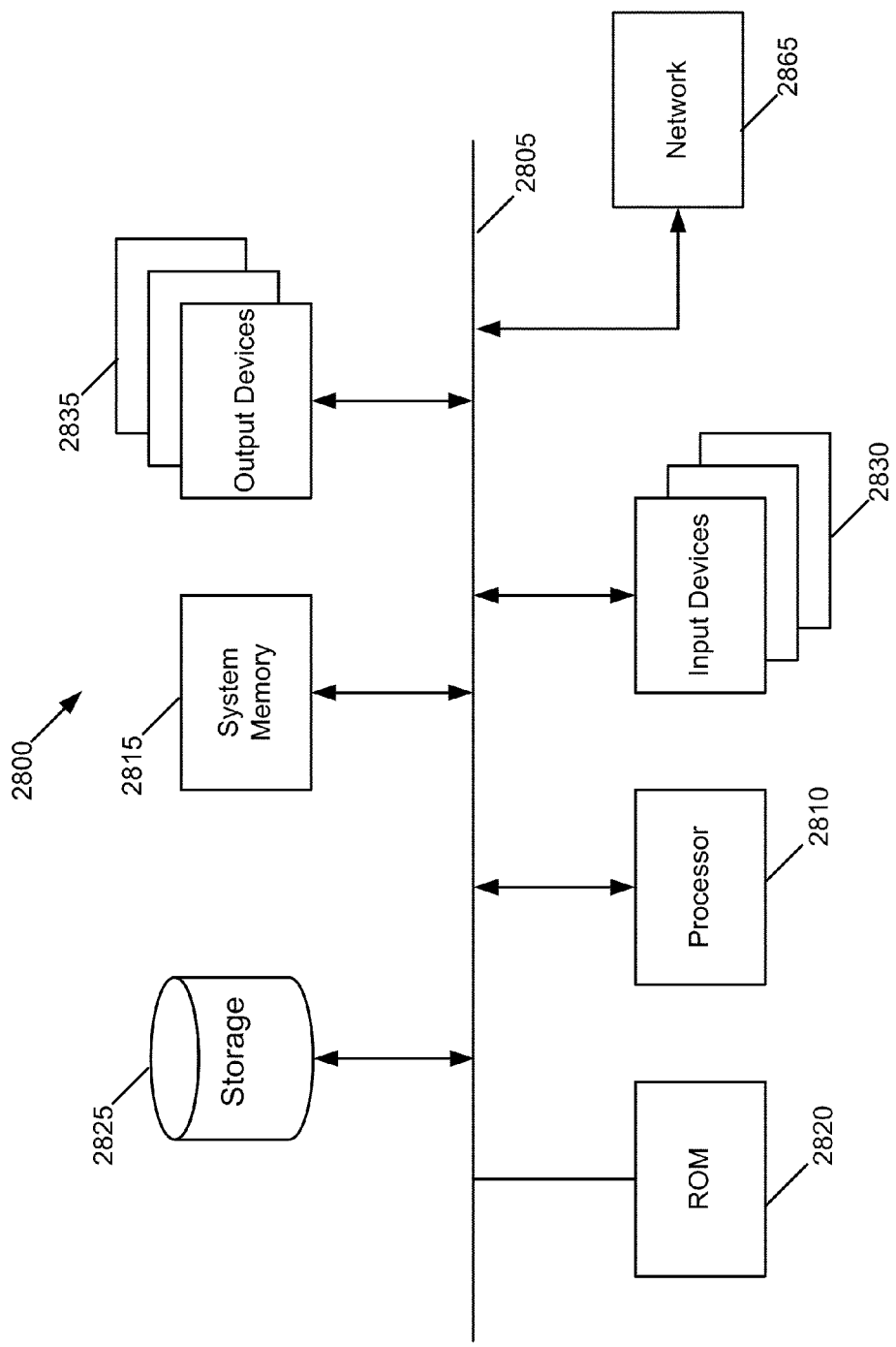
FIG. 28 conceptually illustrates a computer system with which some embodiments of the present invention are implemented.

FIG. 28 conceptually illustrates a computer system with which some embodiments of the present invention are implemented. Computer system 2800 includes a bus 2805, a processor 2810, a system memory 2815, a read-only memory 2820, a permanent storage device 2825, input devices 2830, and output devices 2835.

The bus 2805 collectively represents all system, peripheral, and chipset buses that communicatively connect the numerous internal devices of the computer system 2800. For instance, the bus 2805 communicatively connects the processor 2810 with the read-only memory 2820, the system memory 2815, and the permanent storage device 2825.

From these various memory units, the processor 2810 retrieves instructions to execute and data to process in order to execute the processes of the invention. The read-only memory 2820 stores static data and instructions that are needed by the processor 2810 and other modules of the computer system. The permanent storage device 2825, on the other hand, is a read-and-write memory device. This device is a non-volatile memory unit that stores instructions and data even when the computer system 2800 is off. Some embodiments of the invention use a mass-storage device (such as magnetic or optical disk and its corresponding disk drive) as the permanent storage device 2825. Other embodiments use a removable storage device (such as a floppy disk, and its corresponding disk drive) as the permanent storage device.

Like the permanent storage device 2825, the system memory 2815 is a read-and-write memory device. However, unlike storage device 2825, the system memory 2815 is a volatile read-and-write memory, such as a random access memory. The system memory stores some of the instructions and data that the processor needs at runtime. In some embodiments, the invention's processes are stored in the system memory 2815, the permanent storage device 2825, and/or the read-only memory 2820.

The bus 2805 also connects to the input and output devices 2830 and 2835. The input devices enable the user to communicate information and select commands to the computer system. The input devices 2830 include alphanumeric keyboards and cursor-controllers.

The output devices 2835 display images generated by the computer system. For instance, these devices might display a three-dimensional temperature map. The output devices include printers and display devices such as cathode-ray tubes or liquid crystal displays.

Finally, as illustrated in FIG. 28, the bus 2805 also couples computer 2800 to a network 2840 through a network adapter (not shown). In this manner, the computer can be part of a network of computers (such as a local area network, a wide area network, or an intranet) or a network of network (such as the Internet).

Any or all of the components of computer system 2800 may be used in conjunction with the invention. However, one of ordinary skill in the art would appreciate that any other system configuration may also be used in conjunction with the present invention.

Some embodiments include electronic components, such as microprocessors, storage and memory that store computer program instructions in a machine-readable or computer-readable medium. Examples of machine-readable media or computer-readable media include, but are not limited to magnetic media such as hard disks, memory modules, magnetic tapes, optical media such as CD-ROMs and holographic devices, magneto-optical media such as optical disks, and hardware devices that are specifically configured to store and execute program code. Examples of these hardware devices include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, the process 400 computes two power dissipation values of each circuit module at two temperatures and then derives coefficients for the non-linear heat source model from these two values. In other embodiments, the process 400 might receive the coefficients of the non-linear leakage power model for a circuit module from a manufacturer or a developer of a circuit library. In such a situation, the process 400 might then only need one to compute one power dissipation value for a circuit module to formulate its heat flow equation.

Also, several embodiments described above treat only leakage power as the power dissipation component that is dependent on the temperature. As mentioned above, the total power dissipation in an IC is made up of leakage power, switching power, and internal power of the various circuit modules. Other embodiments may treat other components of the power dissipation (e.g., switching power and internal power) as temperature-dependent components. The temperature dependence of these other components might be specified through an exponential model or some other model. The above thermal analysis is described in view of taking into account the dielectric and wiring component of an IC design layout. However, the thermal analysis may take into account other types of components. As mentioned above, the IC design layout can be divided into uniform elements. However, some embodiments may divide the IC design into non-uniform elements. In addition, some embodiments may divide the IC design layout based on other criteria. For example, some embodiments may divide the IC design layout so that each element only includes one type of component. Moreover, the above method is described for computing a conductivity group of values that takes into account wiring. However, the above method can also be used to compute a power group of values that takes into account wiring. Thus, the implementation of some embodiments of the invention allows a thermal analysis of an IC design layout to be efficiently performed when the wiring component of the IC design layout is taken into account. Accordingly, one of ordinary skill in the art would understand that the invention is not to be limited by the foregoing illustrative details, but rather is to be defined by the appended claims.

What is claimed is:

1. A method for performing thermal analysis of an integrated circuit ("IC") design layout, the method comprising:
dividing the IC design layout into a set of elements comprising a plurality of nodes, each node located on a vertex of an element;
for each element, computing a first set of entry values for each node of the element based on a dielectric area in the element, each entry value representing an effect on heat flow at a particular node of an element by a temperature change at another node on the element;
for each element having a wire, computing a second set of entry values for each node based on the wire;
calculating a plurality of sets of conductivity values based on the first and second sets of entry values computed for each element; and
at a computer, identifying a temperature distribution for the IC design layout based on the plurality of sets of conductivity values by solving a heat flow equation that is a set of temperature values corresponding to the temperature values of each node on the set of elements.

2. The method of claim 1, wherein calculating each set of conductivity values comprises computing an effective thermal conductivity value for each element.

3. The method of claim 2, wherein computing the effective thermal conductivity value for each element comprises:
identifying a thermal conductivity value for a dielectric of the element;
computing a total width of a set of full length wires in the element;
computing a residual region for the element; and
computing a particular effective thermal conductivity value for the element based on the thermal conductivity value of the dielectric, the total width of the set of full length wires and the residual region.

4. The method of claim 3, wherein the particular effective thermal conductivity value is used to compute a particular set of conductivity values.

5. The method of claim 3, wherein the residual region comprises a partial length wire.

6. The method of claim 3, wherein the residual region comprises a portion of a circuit module.

7. The method of claim 3, wherein the residual region comprises a via.

8. The method of claim 2, wherein computing the effective thermal conductivity value for each element comprises using an element model that is a representation of a composition of a particular element of the IC design layout to compute the effective thermal conductivity value of the particular element.

9. The method of claim 8, wherein the composition of the particular element comprises one of a set of full length wires, a residual region and a dielectric region.

10. The method of claim 9, wherein the residual region is represented as a triangle region in the element model.

11. The method of claim 1, wherein calculating the plurality of sets of conductivity values comprises:
for each element, computing a particular effective thermal conductivity value;
grouping the particular effective thermal conductivity values into sets of effective thermal conductivity values;
for each set of effective thermal conductivity values, specifying a representative effective thermal conductivity value; and
using the specified representative effective thermal conductivity values to compute the plurality of sets of conductivity values.

12. The method of claim 11, wherein a particular representative thermal conductivity value for a particular set of effective thermal conductivity values is an average value of the particular set of effective thermal conductivity values.

13. The method of claim 11, wherein effective thermal conductivity values that are within a threshold value of a first value are grouped in a first set of effective thermal conductivity values.

14. The method of claim 1, wherein calculating each set of conductivity values comprises using at least one parameterized function to compute the set of conductivity values.

15. The method of claim 1, wherein computing the second set of entry values based on the wire comprises using at least one parameterized function that is obtained by carrying out a symbolic integration of a set of finite element equations for heat transfer for a set of wire location parameters.

16. The method of claim 1, wherein calculating each set of conductivity values further comprises:
identifying another wire in the IC design layout;
for each particular element that comprises said another wire, computing a third set of entry values based on said another wire; and
for each particular element that comprises said another wire, adding said third set of entry values to the sets of entry values for the particular element.

17. The method of claim 16, wherein the wire and said another wire are wires of a same net.

18. The method of claim 16, wherein the wire is a wire of a first net and said another wire is a wire of a second net.

19. A non-transitory computer readable medium storing a computer program for performing thermal analysis of an integrated circuit ("IC") design layout, the computer program executable by at least one processor, the computer program comprising sets of instructions for:

dividing the IC design layout into a set of elements comprising a plurality of nodes, each node located on a vertex of an element, wherein at least one element is a non-homogenous element that comprises a set of full length wires and a set of residual components;

computing, for each non-homogenous element, a first set of entry values for each node of the non-homogenous element based on a dielectric area in the non-homogenous element, each entry value representing an effect on heat flow at a particular node of an element by a temperature change at another node on the element;

computing, for each non-homogenous element, a second set of entry values for each node based on each full length wire;

computing for each non-homogenous element, a set of equivalent thermal conductivity values by using an element model that represents the non-homogenous element as an equivalent homogenous element, wherein the set of equivalent thermal conductivity values are based on the first and second sets of entry values; and identifying a temperature distribution for the IC design layout based on the set of equivalent thermal conductivity values.

20. The non-transitory computer readable medium of claim 19, wherein representing the non-homogenous element as an equivalent homogenous element comprises dividing a non-homogenous element into a wire region and a residual region, the wire region representing a set of full-length wires in the non-homogenous element and the residual region representing a set of residual components in the non-homogenous element.

21. The non-transitory computer readable medium of claim 20, wherein the set of residual components comprises a portion of a circuit module.

22. The non-transitory computer readable medium of claim 20, wherein the set of residual components comprises a via.

23. The non-transitory computer readable medium of claim 19, wherein the set of instructions for computing the set of equivalent thermal conductivity values comprises sets of instructions for:
    dividing the element model into a plurality of areas;
    computing a thermal conductivity value for each area in the plurality of areas; and
    computing an equivalent thermal conductivity value for the non-homogenous element based on the computed thermal conductivity values.

24. The non-transitory computer readable medium of claim 23, wherein the thermal conductivity value for an area of the plurality of areas is calculated based on the set of full-length wires in the non-homogenous element.

25. The non-transitory computer readable medium of claim 24, wherein the area is within a wire region of the element model.

26. The non-transitory computer readable medium of claim 23, wherein a thermal conductivity value for an area of the plurality of areas is calculated based on the set of residual components in the non-homogenous element.

27. The non-transitory computer readable medium of claim 23, wherein the equivalent thermal conductivity value is computed by averaging the plurality of thermal conductivity values.

* * * * *